United States Patent
Farmer

(10) Patent No.: US 7,146,104 B2
(45) Date of Patent: Dec. 5, 2006

(54) METHOD AND SYSTEM FOR PROVIDING A RETURN DATA PATH FOR LEGACY TERMINALS BY USING EXISTING ELECTRICAL WAVEGUIDES OF A STRUCTURE

(75) Inventor: James O. Farmer, Lilburn, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 0 days.

(21) Appl. No.: 10/418,531

(22) Filed: Apr. 17, 2003

(65) Prior Publication Data

US 2003/0194241 A1  Oct. 16, 2003

Related U.S. Application Data

(63) Continuation-in-part of application No. 09/899,410, filed on Jul. 5, 2001, now Pat. No. 6,973,271.

(60) Provisional application No. 60/373,535, filed on Apr. 17, 2002.

(51) Int. Cl.
  *H04B 10/00* (2006.01)
(52) U.S. Cl. ............................................. 398/72; 398/67
(58) Field of Classification Search ................. 398/92, 398/115, 117, 66–73
  See application file for complete search history.

(56) References Cited

U.S. PATENT DOCUMENTS

| | | | |
|---|---|---|---|
| 4,500,990 A | 2/1985 | Akashi | |
| 4,665,517 A | 5/1987 | Widmer | |
| 4,763,317 A | 8/1988 | Lehman et al. | |
| 4,956,863 A | 9/1990 | Goss | |
| 4,975,899 A | 12/1990 | Faulkner | |
| 5,132,992 A | 7/1992 | Yurt et al. | |
| 5,179,591 A | 1/1993 | Hardy et al. | |
| 5,247,347 A * | 9/1993 | Litteral et al. | ............... 725/114 |
| 5,249,194 A | 9/1993 | Sakanushi | |
| 5,253,250 A | 10/1993 | Schlafer et al. | |
| 5,253,275 A | 10/1993 | Yurt et al. | |
| 5,325,223 A | 6/1994 | Bears | |
| 5,345,504 A | 9/1994 | West, Jr. | |
| 5,349,457 A | 9/1994 | Bears | |

(Continued)

FOREIGN PATENT DOCUMENTS

EP  0713347 A2  5/1996

(Continued)

OTHER PUBLICATIONS

Effenberger et al., "G.983.VideoReturn Path," Oct. 2004, International Telecommunication Union, Telecommunication Standardization Section, Study Group 15—Contribution 13, pp. 1-18.

(Continued)

*Primary Examiner*—Agustin Bello
(74) *Attorney, Agent, or Firm*—King & Spalding LLP

(57) ABSTRACT

A return path may include a modem pair that is coupled to existing electrical waveguides in a structure such as a house or office building. Specifically, a first modem of the modem pair may be coupled to a first end of a coaxial cable and to a video service terminal. A second modem of the modem pair may be coupled to a second end of the coaxial cable and a data interface. The first modem can modulate video control return packets onto an RF carrier that is propagated over the coaxial cable to the second modem. The video control return packets can be formatted as Ethernet type packets. The second modem can demodulate the RF carrier to extract the video control return packets and to forward these packets towards a data service hub.

9 Claims, 13 Drawing Sheets

U.S. PATENT DOCUMENTS

| | | | |
|---|---|---|---|
| 5,365,588 A | 11/1994 | Bianco et al. | |
| 5,412,498 A | 5/1995 | Arstein et al. | |
| 5,469,507 A | 11/1995 | Canetti et al. | |
| 5,510,921 A | 4/1996 | Takai et al. | |
| 5,528,582 A | 6/1996 | Bodeep et al. | |
| 5,534,912 A * | 7/1996 | Kostreski | 725/106 |
| 5,541,917 A | 7/1996 | Farris | |
| 5,550,863 A | 8/1996 | Yurt et al. | |
| 5,557,317 A * | 9/1996 | Nishio et al. | 725/92 |
| 5,559,858 A | 9/1996 | Beveridge | |
| 5,572,347 A | 11/1996 | Burton et al. | |
| 5,572,348 A | 11/1996 | Carlson et al. | |
| 5,572,349 A | 11/1996 | Hale et al. | |
| 5,666,487 A * | 9/1997 | Goodman et al. | 709/246 |
| 5,701,186 A | 12/1997 | Huber | |
| 5,706,303 A | 1/1998 | Lawrence | |
| RE35,774 E * | 4/1998 | Moura et al. | 725/118 |
| 5,778,017 A | 7/1998 | Sato et al. | |
| 5,790,523 A | 8/1998 | Ritchie, Jr. et al. | |
| 5,793,413 A | 8/1998 | Hylton et al. | |
| 5,802,089 A | 9/1998 | Link | |
| 5,822,102 A * | 10/1998 | Bodeep et al. | 398/69 |
| 5,861,966 A | 1/1999 | Ortel | |
| 5,875,430 A | 2/1999 | Koether | |
| 5,880,864 A | 3/1999 | Williams et al. | |
| 5,892,865 A | 4/1999 | Williams | |
| 5,953,690 A | 9/1999 | Lemon et al. | |
| 5,969,836 A | 10/1999 | Foltzer | |
| 6,002,720 A | 12/1999 | Yurt et al. | |
| 6,041,056 A * | 3/2000 | Bigham et al. | 370/395.64 |
| 6,097,159 A | 8/2000 | Mogi et al. | |
| 6,097,515 A * | 8/2000 | Pomp et al. | 398/45 |
| 6,144,702 A | 11/2000 | Yurt et al. | |
| 6,151,343 A | 11/2000 | Jurgensen | |
| RE37,125 E | 4/2001 | Carlson et al. | |
| 6,295,148 B1 | 9/2001 | Atlas | |
| 6,336,201 B1 | 1/2002 | Geile et al. | |
| 6,356,369 B1 | 3/2002 | Farhan | |
| 6,360,320 B1 | 3/2002 | Ishiguro et al. | |
| 6,385,366 B1 | 5/2002 | Lin | |
| 6,427,035 B1 | 7/2002 | Mahony | |
| 6,460,182 B1 | 10/2002 | BuAbbud | |
| 6,483,635 B1 | 11/2002 | Wach | |
| 6,546,014 B1 | 4/2003 | Kramer et al. | |
| 6,577,414 B1 * | 6/2003 | Feldman et al. | 725/129 |
| 6,674,967 B1 | 1/2004 | Skrobko et al. | |
| 6,707,024 B1 | 3/2004 | Miyamoto et al. | |
| 6,740,861 B1 | 5/2004 | Matsuda | |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0030785 A1 | 10/2001 | Pangrac et al. | |
| 2002/0021465 A1 | 2/2002 | Moore, Jr. et al. | |
| 2002/0039218 A1 | 4/2002 | Farmer et al. | |
| 2002/0089725 A1 | 7/2002 | Farmer et al. | |
| 2002/0135843 A1 | 9/2002 | Gruia | |
| 2002/0164026 A1 | 11/2002 | Hutma | |
| 2003/0090302 A1 | 5/2003 | Skrobko et al. | |

FOREIGN PATENT DOCUMENTS

| | | |
|---|---|---|
| EP | 0720322 A2 | 7/1996 |
| EP | 0 566 662 | 11/1999 |
| EP | 0955739 A2 | 11/1999 |
| EP | 0 933 892 | 10/2003 |
| JP | 4-504433 | 3/2002 |
| MX | 180038 | 11/1995 |
| TW | 72821 | 8/1995 |
| WO | WO 01/27940 A2 | 4/2001 |
| WO | WO 02/030019 A3 | 4/2002 |
| WO | WO 02/30020 A2 | 4/2002 |
| WO | WO 02/060123 A2 | 8/2002 |

OTHER PUBLICATIONS

International Preliminary Examination Report of Nov. 19, 2003, for PCT/US03/07814.

International Preliminary Report on Patentability of Apr. 1, 2005 for PCT/US01/51350.

International Preliminary Examination Report of Sep. 17, 2004 for PCT/US03/12231.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc-Commun, vol. 147, No. 5, Oct. 2000, pp. 269-275.

J. Masip-Tomé, et al., "Providing Differentiated Service Categories in Optical Packet Networks", Proceedings of Teletraffic Congress. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachvertage Schicle & Schon, Berlin, DE, vol. 16, No. 6, Dec. 1, 1995, pp. 216-226.

Walker Ciciora et al., "Modern Cable Television Technology: Video, Voice, and Data Communications", ©1999 by Morgan Kaufman Publishers, Inc., pp. 167-176.

International Search Report dated Apr. 21, 2003 for PCT/US02/28734.

Written Opinion dated May 6, 2003 for PCT/US01/21298.

Global Access™, Universal Services Gateway, USG100, ARRIS, pp. 1-2, Oct. 18, 2002.

Global Access™, Universal Access Switch, UAS4024, ARRIS, pp. 1-2, Aug. 28, 2002.

International Search Report dated Dec. 4, 2002 for PCT/US02/27398.

International Search Report dated Dec. 17, 2002 for PCT/US02/15861.

"Trading Update and Operational Review Presentation" Marconi, Sep. 4, 2001, pp. 1-35.

"Cable Marker" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC —New FITL Configuration" 1 pg, Marconi Corporation, PLC, 2002 at www.Marconi.com.

"En-Touch" at 5 pgs, Marconi Corporation, PLC, 2002 www.Marconi.com.

"Fiber to the Home" International Engineering Consortium (no date) pp. 1-10, available at www.iec.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5pgs.

"Deep Fiber HFC: A Next-Generation Integrated Access Solution Offering Significant Improvement Over Traditional HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6pgs.

"Fiber Optics on New Development MDUs: A Research Summary," Marconi Corporation PLC, May 2000, 5pgs.

"Thermal Management Challenges: Small ONU Enclosures," Marconi Corporation PLC, May 2000, 9pgs.

"Passive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linnell, "A Wide-Band Local Access System Using Emerging-Technology Components," IEEE, Jul. 1986, pp. 612-618.

"Digital Broadband Delivery System: Out of Band Transport–Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Policing and Shaping Overview" *Quality of Service Solutions Configuration Guide*, Cisco Systems, Inc., no date.

"Cisco IOS™ Software Quality of Service Solutions," Cisco Systems, Inc. 1998, 28 pgs.

International Search Report for PCT/US01/21298, 2 pgs, mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineering Consortium, 2000 at www.iec.org.

Bourne, John et al., "Heathrow—Experience and Evolution" IEEE, 1990, pp. 1091-1095.

Miki, Tetsuya et al., "A Design Concept on Fiber-Optic Wavelength-Division-Multiplexing Subscriber Loop System" WTG—Fachber, 1980, pp. 41-45.

Yamaguchi, K. et al., "A Broadband Access Network Based on Optical Signal Processing: The Photonic Highway" IEEE, 1990, pp. 1030-1037.

International Search Report of Jul. 7, 2003 for PCT/US01/51350.

Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.

International Search Report of Jul. 2, 2003 for PCT/US03/07814.

International Search Report of Oct. 3, 2003 for PCT/US03/12231.

Ciciora, Walter S. et al., "Modern Cable Television Technology: Video, Voice, and Data Communications", ©1999, pp. 162-214, Chapter 4, Morgan Kaufmann Publishers, Inc., San Francisco, California.

Glaesemann, G. Scott et al., "The Mechanical Reliability of Corning® Optical Fiber in Bending White Paper", Sep. 2002, pp. 1-4.

Corning® SMF-28™ Optical Fiber Product Information,"Corning® Single-Mode Optical Fiber", Apr. 2002, pp. 1-4.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

Optical Networks Daily, a Publication of Optical Keyhole, Aug. 26, 2003, pp. 1-13.

McDevitt et al., Switched vs Broadcast Video for Fiber-to-the Home Systems, Alcatel Network Systems, 1990, IEEE, CH2829-0/90/0000-1109, pp. 1109-1119.

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC—Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

\* cited by examiner

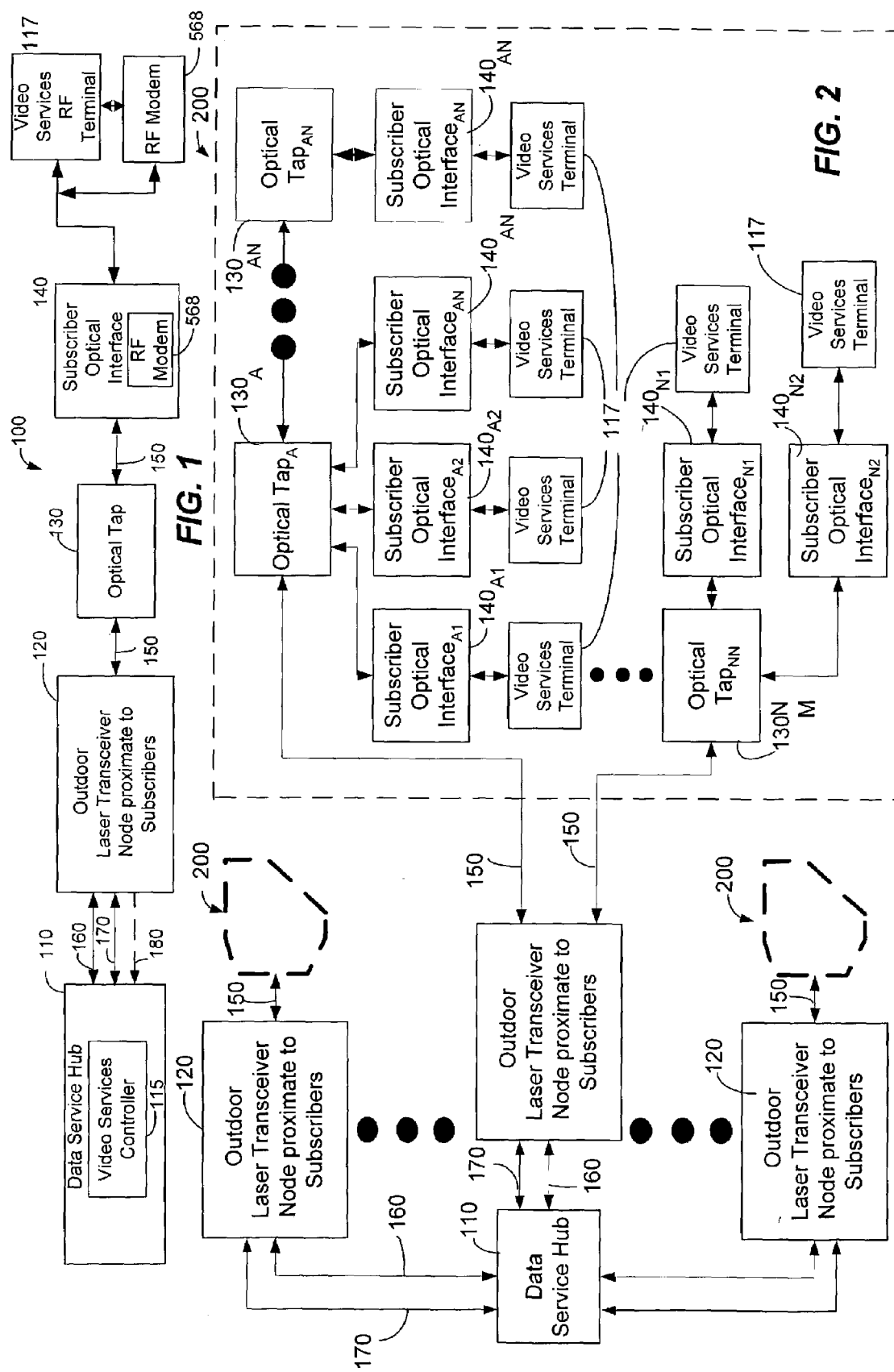

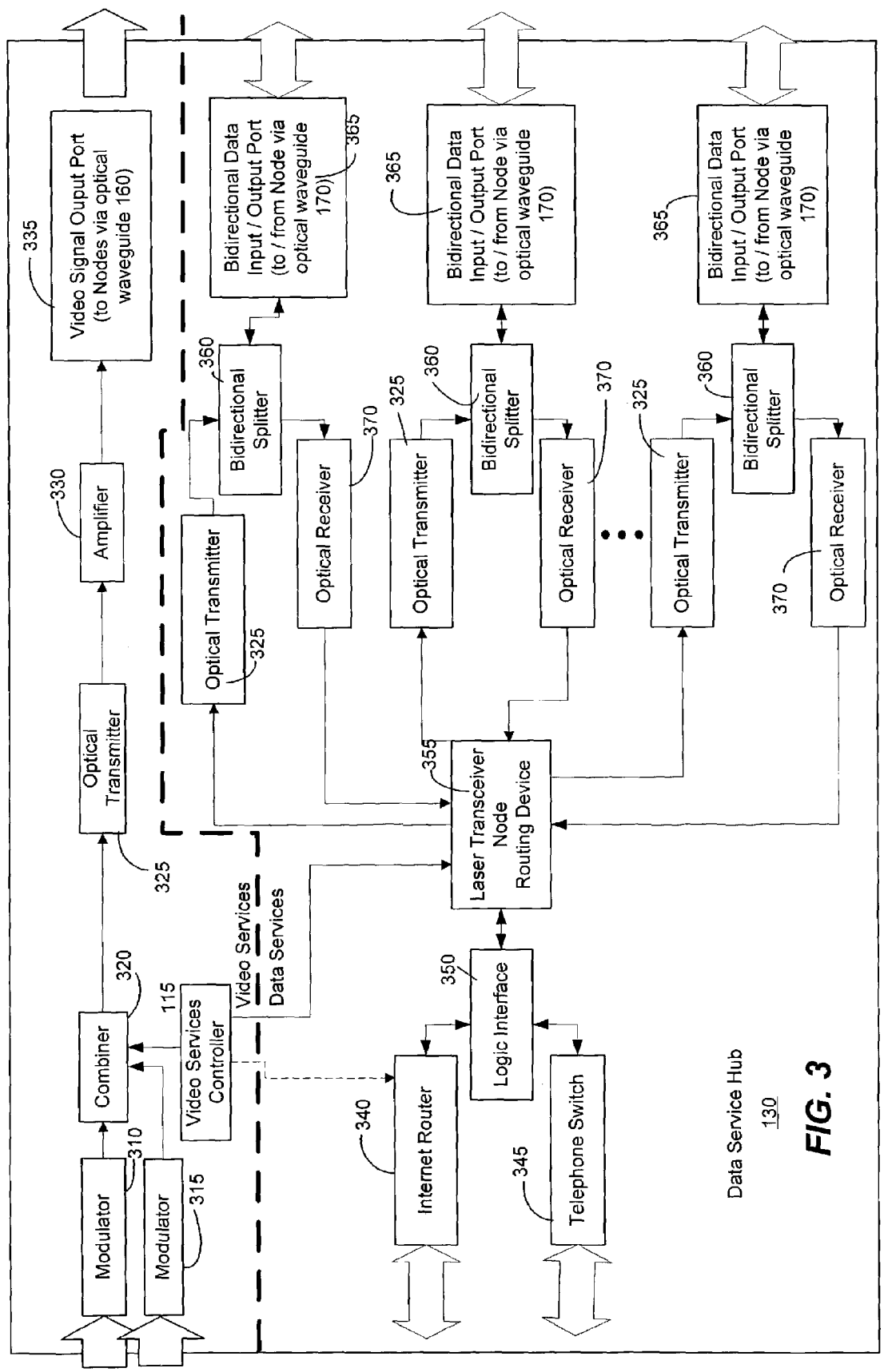

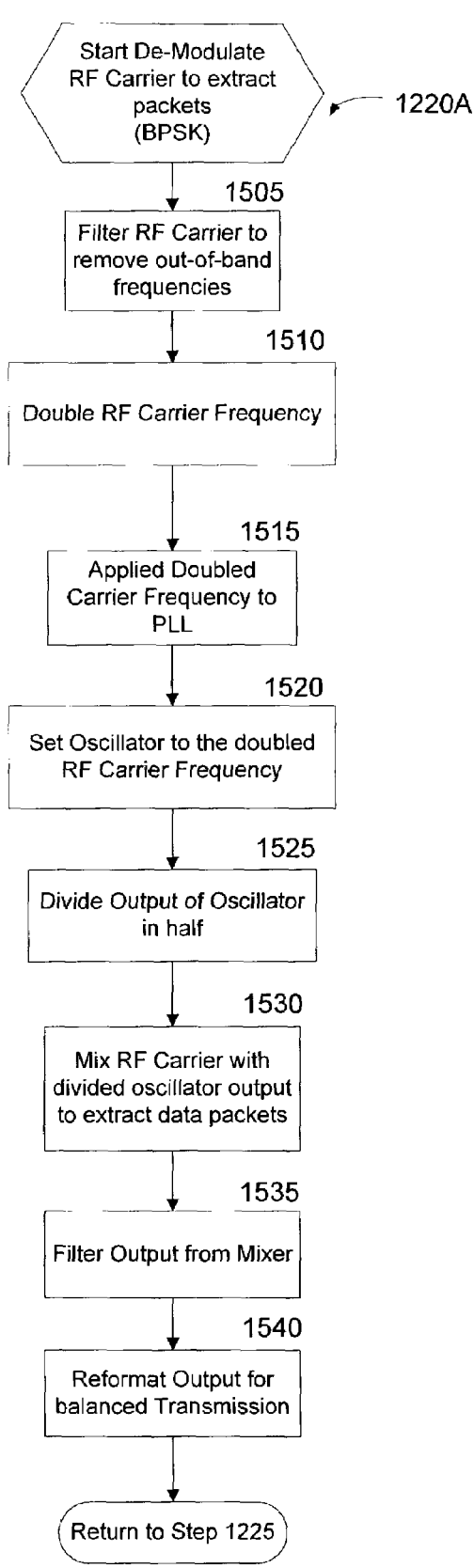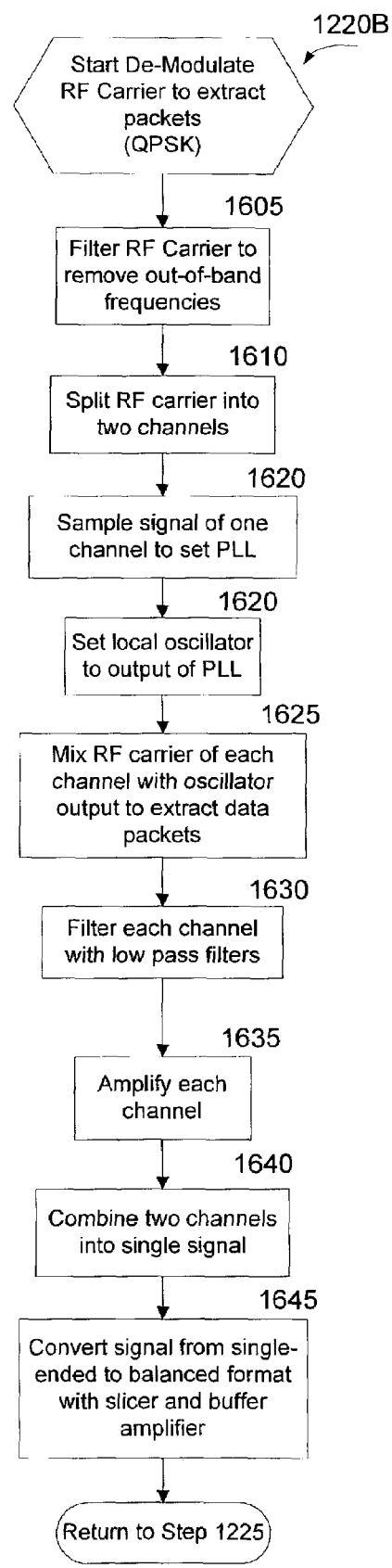
FIG. 15
FIG. 16

METHOD AND SYSTEM FOR PROVIDING A RETURN DATA PATH FOR LEGACY TERMINALS BY USING EXISTING ELECTRICAL WAVEGUIDES OF A STRUCTURE

STATEMENT REGARDING RELATED APPLICATIONS

The present application is a continuation-in-part of non-provisional patent application entitled, "System and Method for Communicating Optical Signals Between A Data Service Provider and Subscribers," filed on Jul. 5, 2001 now U.S. Pat. No. 6,973,271 and assigned U.S. application Ser. No. 09/899,410; and the present application also claims priority to provisional patent application entitled, "Ethernet Extension over Coax," filed on Apr. 17, 2002 and assigned U.S. application Ser. No. 60/373,535. Both the non-provisional and provisional applications are hereby incorporated by reference.

TECHNICAL FIELD

The present invention relates to video, voice, and data communications. More particularly, the present invention relates to a fiber-to-the-home (FTTH) system that is capable of propagating video control return signals from a subscriber to a data service provider.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While the FTTH optical network architecture has been a dream of many data service providers because of the aforementioned capacity of optical fibers, implementing the FTTH optical network architecture may encounter some problems associated with legacy systems that are in current use by subscribers. For example, many subscribers of data service providers use set top terminals (STTs) to receive and transmit information related to video services. The conventional set top terminals are usually coupled to a coaxial cable. The coaxial cable, in turn, is then connected to fiber optic cables in a hybrid fiber-coax (HFC) system. The coaxial cable from the set top terminals in combination with the fiber optic cables provide a two way communication path between the set top terminal and the data service hub for purposes such as authorizing a subscriber to view certain programs and channels.

For example, conventional set top terminals coupled to coaxial cables may provide impulse pay-per-view services. Impulse pay-per-view services typically require two way communications between the set top terminal and the data service provider. Another exemplary service that may require two-way communication passed between the set top terminal and the data service provider is video-on-demand (VOD) services.

For video-on-demand services, a subscriber can request a program of his choosing to be played at a selected time from a central video file server at the data service hub. The subscriber's VOD program request is transmitted upstream on a return channel that comprises coaxial cables coupled to fiber optic cables. With the VOD service, a subscriber typically expects VCR-like control for these programs which includes the ability to "stop" and "play" the selected program as well as "rewind" and "fast forward" the program.

In conventional HFC systems, a return RF path from the subscriber to the data service hub is provided. The RF return path is needed because a conventional set top terminal usually modulates its video service upstream data onto an analog RF carrier. While the video service upstream data may be modulated onto an RF carrier, it is recognized that the upstream data may be in digital form.

A RF return path typically comprises two-way RF distribution amplifiers with coaxial cables and two-way fiber optic nodes being used to interface with fiber optic cables. A pair of fiber optic strands can be used to carry the radio frequency signals between the head end and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). In a more recent embodiment, the upstream spectrum (typically 5–42 MHz in North America) is digitized at the node. The digital signals are transmitted to the headend, where they are converted back to the analog RF spectrum of 5–42 MHz. This process typically uses high data rates (at least 1.25 Gb/s) and a fiber or wavelength dedicated to return traffic from one or two nodes.

Unlike HFC systems, conventional FTTH systems typically do not comprise a return RF path from the subscriber to the data service hub because most of the return paths comprise only fiber optic cables that propagate digital data signals as opposed to analog RF signals. In conventional FTTH systems, a downstream RF path is usually provided because it is needed for the delivery of television programs that use conventional broadcast signals. This downstream RF path can support RF modulated analog and digital signals as well as RF modulated video return control signals for any set top terminals that may be used by the subscriber. However, as noted above, conventional FTTH systems do not provide for any capability of supporting a video control return path for video control return signals generated by the legacy set top terminal.

Some conventional legacy set top terminals are being equipped with dedicated data cables in addition to coaxial cables in order to support upstream digital communications. For example, some conventional legacy set top terminals can include Ethernet data ports in order to support Category 5 type cabling. These dedicated cables for upstream digital communications are usually connected to an interface located on a side of structure such as a home or office building. The interface typically has hardware used to convert the upstream digital communications to the optical domain.

While the legacy set top terminals having the combination of coaxial cables for downstream analog communications and dedicated data cables for upstream digital communications may have solved the return path problem of the conventional terminals discussed above, it has created other problems: entire structures such as homes and office buildings will need rewiring such that the dedicated data cables are positioned within the structures and adjacent to the existing coaxial cables. Such rewiring can be very difficult and costly because finished interiors of the structures will be disturbed or damaged in order to make room for the new dedicated data cables.

Accordingly, there is a need in the art for the system and method for communicating optical signals between a data service provider and a subscriber that can eliminate the need for damaging a structure to house new cables. There is also a need in the art for a system and method that provides a video control return path for legacy video service terminals that can minimize the hardware needed to support upstream video control return signals. A further need exists in the art for a system and method that provides a video control return path that can minimize cabling but than can support upstream digital contention network protocols such as Ethernet formatted packets. Another need exists in the art for supporting legacy video service controllers and terminals with an all optical network architecture external to the subscriber's location.

SUMMARY OF THE INVENTION

The present invention is generally drawn to a system and method for efficient propagation of data and broadcast signals over an optical fiber network. More specifically, the present invention is generally drawn to an optical network architecture that can provide a return path for video control return signals that are generated by existing legacy video service terminals. Video service terminals can comprise set top terminals or other like communication devices that may support upstream communications that can include digital packets formatted as Ethernet type packets.

In one exemplary embodiment, a portion of the return path may include a modem pair that is coupled to existing electrical waveguides in a structure such as a house or office building. Specifically, a first modem of the modem pair may be coupled to a first end of a coaxial cable and to a video service terminal. A second modem of the modem pair may be coupled to a second end of the coaxial cable and a data interface.

The first modem can modulate video control return packets onto an RF carrier that is propagated over the coaxial cable to the second modem. According to one exemplary embodiment, the video control return packets can be formatted as Ethernet type packets.

The second modem can demodulate the RF carrier to extract the video control return packets and to forward these packets on to a data interface. At the data interface, the video control return packets can be combined with other data packets. The other data packets can comprise computer data, telephone data, and other like data. After the video control return packets are combined with the other data packets, the packets can be converted to the optical domain by the data interface, where they are propagated to a laser transceiver node.

At the laser transceiver node, the optical data packets are converted back into the electrical domain for further processing. The packets are then converted again to the optical domain and sent to the data service hub where the video control return packets are separated from the other data packets. The video control return packets are routed to a video services controller that manages the downstream video services.

One important feature of both the first and second modem is that each transmitting section of a modem is equipped with an activity detector in order to sense if any packets are present for propagation over the coaxial cable. The activity sensor can control a switch that connects the transmitting section to the coaxial cable. With the activity sensor, the switch can be disconnected when packets are not present and the switch can be turned on or connected when packets are present for transmission over the coaxial cable. This control of the switch can prevent the transmitting section of each modem from generating any noise that could interfere with other RF carriers that may be propagating over the coaxial cable. Alternatively to connecting the transmitting section to the coaxial cable, the switch may enable or disable the transmitting section. Other RF carriers that could be propagating over the coaxial cable could include downstream video signals that can be viewed on a television.

An advantage of the present invention is that the modulation techniques and equipment permit the use of existing electrical waveguides such as coaxial cables that may already exist in a home or office building. In this way, a video control return path may be provided that does not require rewiring of a structure such as a home or office building. Existing electrical waveguides that are typically designed to carry downstream video service signals could be used to carry upstream digital packets that are modulated on an RF carrier.

According to another exemplary embodiment, the first modem described above that can be connected to a video service terminal may have another data port that can be connected to a computer. In this way, the first modem could support both video control return packets generated by a video services terminal as well as data packets generated by a computer. Such an approach would eliminate further rewiring (or wiring of a structure after it is built) in order to support data services for computers and other similar equipment using balanced electrical digital communications such as Ethernet packets.

According to another exemplary aspect of the present invention, downstream video service control packets can also be supported by the first and second modems described above. That is, downstream video service control packets can be sent from the second modem to the first modem in order to be communicated to the video service terminal and ultimately a TV monitor or television.

According to an alternative exemplary aspect of the present invention, downstream analog RF video service control signals can be combined with regular RF video signals. These combined downstream video signals can be supported by optical waveguides and existing coaxial cables. According to this aspect, the downstream analog RF video control service signals do not need to rely on the first and second modems. The downstream analog RF video control service signals share the coaxial cable with downstream RF video signals and are processed by the video service terminal without any modulation or processing by the modems.

A variety of modulation schemes can be employed by the modems of the present invention. According to one exemplary embodiment, Biphase Shift Keying (BPSK) modulation can be employed by the modems. According to another exemplary embodiment, Quadrature Phase Shift Keying (QPSK) modulation can be employed by the modems. However, other modulation techniques can be used without departing from the scope and spirit of the present invention.

BRIEF DESCRIPTION OF THE DRAWINGS

FIG. 1 is a functional block diagram of some core components of an exemplary optical network architecture according to an exemplary embodiment of the present convention that can support legacy video services.

FIG. 2 is a functional block diagram illustrating additional aspects of an exemplary optical network architecture according to an exemplary embodiment of the present invention.

FIG. 3 is a functional block diagram illustrating an exemplary data service hub according to an exemplary embodiment of the present invention.

FIG. 15 is a logic flow diagram illustrating a method for demodulating video control return packets from a radio-frequency (RF) carrier that corresponds with the receiving section of FIG. 9 according to one exemplary embodiment of the present invention.

FIG. 16 is a logic flow diagram illustrating a method for demodulating video control return packets from a radio-frequency (RF) carrier that corresponds with the receiving section of FIG. 11 according to another exemplary embodiment of the present invention.

DETAILED DESCRIPTION OF EXEMPLARY EMBODIMENTS OF THE INVENTION

Figure 4:
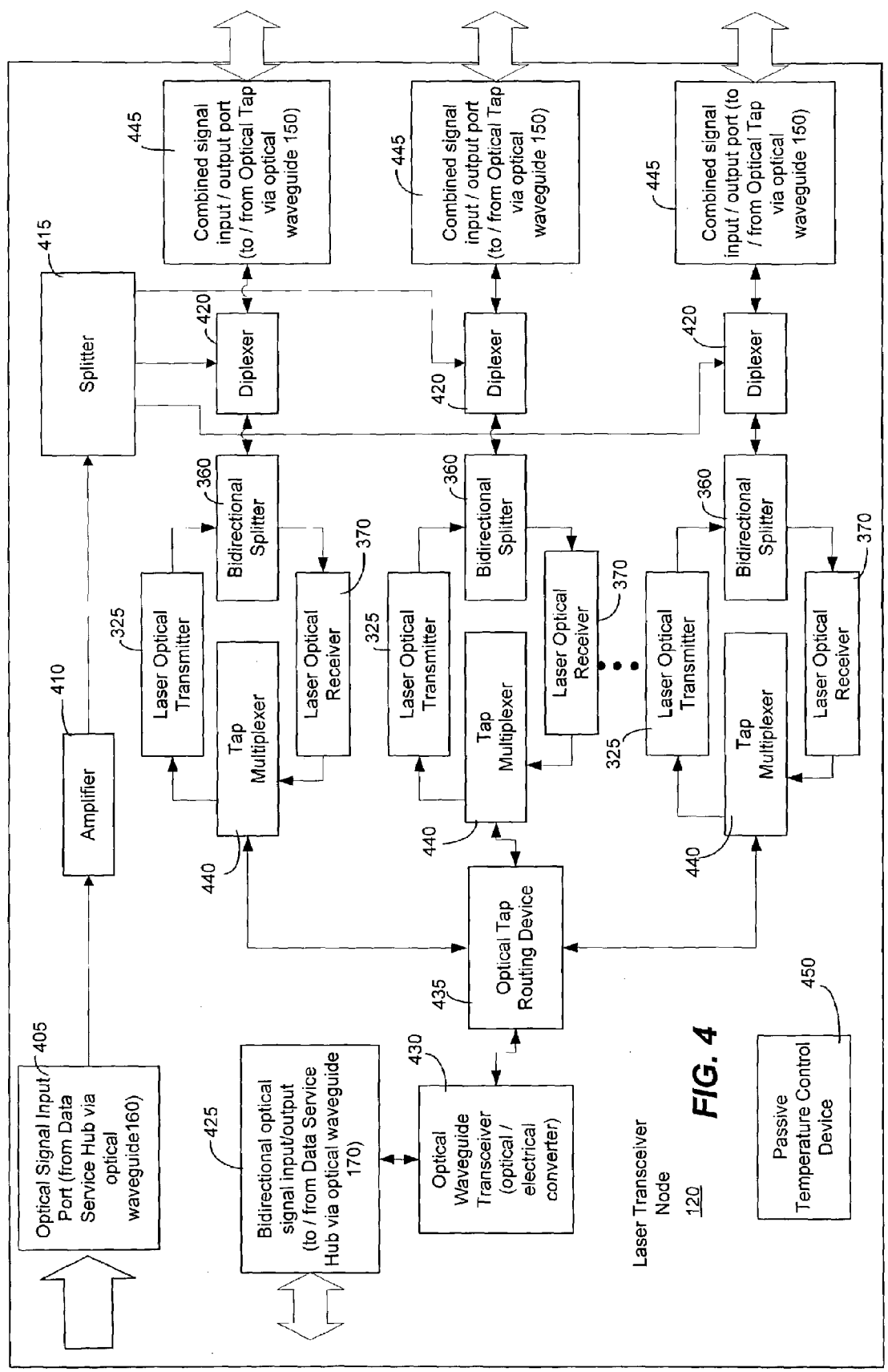
FIG. 4 is a functional block diagram illustrating an exemplary transceiver node according to an exemplary embodiment of the present invention.

The present invention may be embodied in hardware or software or a combination thereof disposed within an optical network. In one exemplary embodiment, the present invention provides a method for inserting video control return packets between upstream packets comprising data generated by a subscriber with a communication device such as a computer or internet telephone. In this way, the present invention can provide a return path for legacy video service terminals that may comprise non-coaxial cable data ports that can share a return path for regular data packets in an optical network architecture. Video service terminals can comprise set top terminals or other like communication devices that may employ a contention (collision sensing) protocol, such as Ethernet-based communications, to transmit upstream information.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that houses a legacy video services controller 115 among other things. The legacy video services controller 115 is typically designed to transmit and receive digital radio-frequency (RF) signals. For the present invention, the video services controller 115 may be modified to also accept Ethernet return signals from Video Services RF Terminals 117. The legacy video services controller 115 can comprise conventional hardware or software (or both) that supports services such as impulse-pay-per-view and video-on-demand.

However, the video services controller 115 is not limited to the aforementioned applications and can include other applications that are not beyond the scope and spirit of the present invention. In some exemplary embodiments, the video services controller can be split between two locations. For example, a portion, primarily a computer, can be located in a first data service hub 110 that services a plurality of second data service hubs 110, while an RF transmitter plus one or more receivers can be located in each second data service hub 110. The first and plurality of second data service hubs 110 can be linked using any of several known communications paths and protocols.

Also, according to one exemplary embodiment, the video services controller 115 supplies digital downstream control signals in the form of data packets that are forwarded to either an internet router 340 (illustrated in FIG. 3, discussed below) or a laser transceiver node routing device 355 (illustrated in FIG. 3, discussed below). The digital downstream video control packets are combined with regular data packets in either the internet router 340 or laser transceiver routing device 355 for further downstream propagation as will be discussed in further detail below with respect to FIG. 6.

Downstream analog video signals for video programs from one or more video servers (not shown) are propagated downstream to the subscribers via modulators 310 and 315 (illustrated in FIG. 3, discussed below). According to an alternative exemplary embodiment, instead of generating digital downstream video control packets, the video services controller 115 can generate RF downstream video control signals that are mixed with the regular video signals for downstream propagation as will be discussed in further detail below with respect to FIG. 7.

The data service hub 110 is connected to a plurality of outdoor laser transceiver nodes 120. The laser transceiver nodes 120, in turn, are each connected to a plurality of optical taps 130. The optical taps 130 can be connected to a plurality of subscriber optical interfaces 140. Connected to each subscriber optical interface 140 can be video services terminal (VST) 117. The video services terminal 117 is designed to work with the video services controller 115. The video services terminal 117 can receive control signals from the video services controller 115 and can transmit video control return signals back to the video services controller 115. The video control return signals may comprise the options selected by a user. The video control return signals can comprise digitally formatted communications such as Ethernet digital data packets.

The video services terminal 117 can permit a subscriber to select options that are part of various exemplary video services such as impulse-pay-per-view and video-on-demand. However, as noted above with respect to the video services controller 115, the present invention is not limited to the aforementioned applications and can include numerous other applications where video control return signals are used to carry information back to the date service hub 110.

Connected to the subscriber optical interface 140 and the video services terminal 117 are radio-frequency (RF) modems 568. Specifically, the subscriber optical interface 140 can comprise one RF modem while a second modem can be attached externally or internally to the video service terminal 568. The RF modems 568 can support upstream as well as downstream communications between the subscriber optical interface 140 and video services terminal. As will be discussed below, the RF modem 568 coupled to the video services terminal (VST) 117 can modulate upstream video control return packets generated by the VST 117 onto an RF carrier.

The RF carrier can be propagated upstream over an existing electrical waveguide, such as an existing coaxial cable already present in a structure that supports downstream video services. The RF modem 568 that is part of the subscriber optical interface 140 can demodulate the RF carrier to extract the upstream video control return packets. The subscriber optical interface 140 can then combine the upstream video control return packets with other data packets, convert the packets to the optical domain, and send the optical packets over an optical waveguide 150 towards the optical tap 130 and the laser transceiver node 120.

Between respective components of the exemplary optical network architecture 100 are optical waveguides such as optical waveguides 150, 160, 170, and 180. The optical waveguides 150–180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the system of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120.

The system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIG. 4.

In one exemplary embodiment of the present invention, three trunk optical waveguides 160, 170, and 180 (that can comprise optical fibers) can propagate optical signals from the data service hub 110 to the outdoor laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast video and control signals generated by the video services controller 115. The signals can be carried in a traditional cable television format wherein the broadcast signals are modulated onto carriers, which in turn, modulate an optical transmitter (not shown in this Figure) in the data service hub 110.

A second optical waveguide 170 can carry upstream and downstream video control return packets and targeted services such as data and telephone services to be delivered to or received from one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise upstream video control return packets and data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 connected between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor laser transceiver node 120. In one exemplary embodiment, six optical fibers 150 are designed to be connected to the outdoor laser transceiver node 120. Through the use of the optical taps 130, sixteen subscribers can be assigned to each of the six optical fibers 150 that are connected to the outdoor laser transceiver node 120.

In another exemplary embodiment, twelve optical fibers 150 can be connected to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The data service hub 130 may further comprise a video services controller 115. The video services controller 115 may comprise an RF modulator to produce the downstream RF control signals, and an RF demodulator to decode upstream RF return signals. According to one exemplary embodiment, the upstream RF demodulator can be replaced by an Ethernet (or other suitable) connection that interfaces with the Internet Router 340 or Laser Transceiver Node Routing Device 355. The downstream RF modulator may or may not be replaced by an Ethernet path.

The signals from the two modulators 310, 315 are combined in a first combiner 320, which also can combine downstream signals from video services controller 115 if RF downstream control communications are being used. As noted above and as will be discussed below, instead of RF downstream control communications the video service controller 115 can employ downstream digital communications that comprise digital packets such as Ethernet packets. But when using RF downstream control communications, the combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, video signals may be generated by another video services controller 115 at another data service hub 110 and sent to the data service hub 110 of FIG. 3 using any of a plurality of different transmission methods known to these skilled in the art. For example, some portion of the video signals may be generated and converted to optical form at a remote first data service hub 110. At a second data service hub 110, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a video signal input/output port 335 which is connected to one or more first optical waveguides 160.

The video signal output port 335 is connected to one or more first optical waveguides 160 that can support optical signals originating from the data service hub 110 and subscriber optical interfaces 140.

The data service hub 110 illustrated in FIG. 3 can further comprise an Internet router 340. According to one and preferred exemplary embodiment, the internet router 340 can separate video control return packets from other data packets and send them to the video services controller 115. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional methods of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

Specifically, instead of using the internet router 340 to identify video control return packets and according to an alternate exemplary embodiment, the laser transceiver node routing device 355 can identify video control return packets and separate them from other data packets. The laser transceiver node routing device 355 could then forward video control return packets to the data to video services controller 115. The connection between the laser transceiver node routing device 355 and the video services controller 115 has been illustrated with dashed lines to indicate that this connection can be made as an alternative to the connection between the internet router 340 and the video services controller 115.

The laser transceiver node routing device 355 can also supply downstream data signals to respective optical transmitters 325. The data signals converted by the optical transmitters 325 can then be propagated to a bi-directional splitter 360. The optical signals sent from the optical transmitter 325 into the bidirectional splitter 360 can then be propagated towards a bi-directional data input/output port 365 that is connected to a second optical waveguide 170 that supports bi-directional optical data signals between the data service hub 110 and a respective laser transceiver node 120.

Upstream optical signals received from a respective laser transceiver node 120 can be fed into the bidirectional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Referring now to FIG. 4, this Figure illustrates a functional block diagram of an exemplary outdoor laser transceiver node 120 of the present invention. In this exemplary embodiment, the laser transceiver node 120 can comprise an optical signal input port 405 that can receive optical signals propagated from the data service hub 110 that are propagated along a first optical waveguide 160. The optical signals received at the optical signal input port 405 can comprise downstream broadcast video data. According to one exemplary embodiment as will be explained in more detail below the optical signal input port 405 can also comprise downstream video service control signals.

The downstream optical signals received at the input port 405 are propagated through an amplifier 410 such as an Erbium Doped Fiber Amplifier (EDFA) in which the optical signals are amplified. The amplified optical signals are then propagated to an optical splitter 415 that divides the downstream broadcast video optical signals (and in the embodiment discussed in more detail below, video service control signals if sent on RF modulated carriers) among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream video control return packets as they arrive, by each tap multiplexer 440. The optical tap routing device is connected to each tap multiplexer 440 to receive these upstream data and video control return packets. The optical tap routing device 435 can relay upstream video control return packets and information packets that can comprise data and/or telephony packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or, tap multiplexer 440) is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 are to receive a downstream electrical signal, or identify which tap multiplexer 440 propagated an upstream optical signal (that is received as an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports.

Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The single ports of the optical tap routing device 435 are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 525 and laser optical receiver 370. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services and downstream RF video control signals (if used) as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
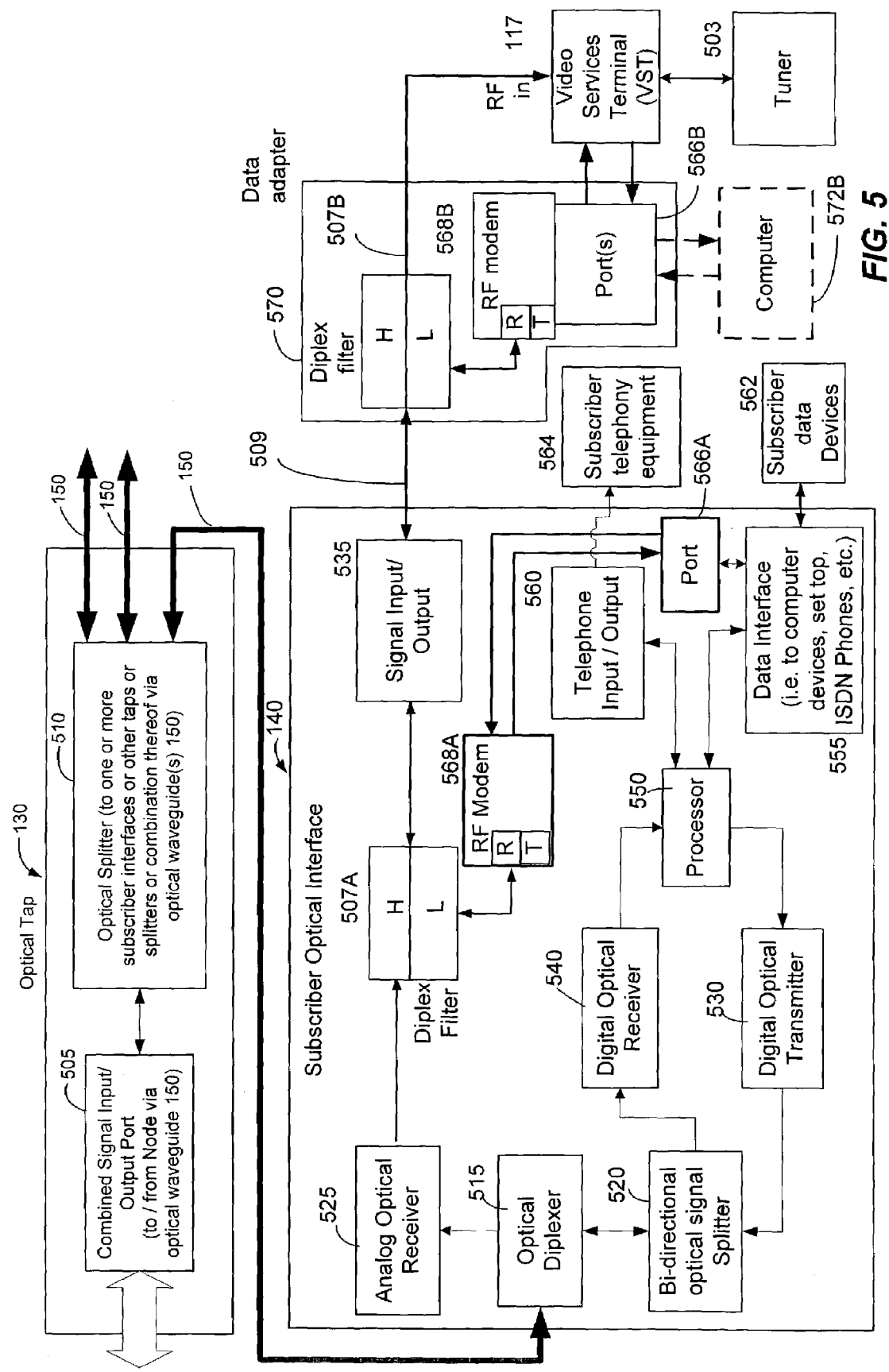
FIG. 5 is a functional block diagram illustrating an optical tap coupled to a subscriber optical interface according to an exemplary embodiment of the present invention.

Referring now to FIG. 5, this Figure is a functional block diagram illustrating an optical tap 130 connected to a subscriber optical interface 140 by an optical waveguide 150 according to one exemplary embodiment of the present invention. The optical tap 130 can comprise a combined signal input/output port 505 that is connected to another distribution optical waveguide 150 that is connected to a laser transceiver node 120. As noted above, the optical taps 130 can comprise an optical splitter 510 that can be a 4-way or 8-way optical splitter. Other optical taps having fewer or more than 4-way or 8-way splits are not beyond the scope of the present invention.

The optical tap 130 can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of distribution optical waveguides 150 so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 with respect to another exemplary embodiment (not shown).

The subscriber optical interface 140 functions to convert downstream optical signals received from the optical tap 130 into the electrical domain that can be processed with appropriate communication devices. The subscriber optical interface 140 further functions to convert upstream data and video control return signals into upstream optical signals that can be propagated along a distribution optical waveguide 150 to the optical tap 130.

The subscriber optical interface 140 can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals such as upstream data packets and upstream video control return packets to optical form so that the optical signals can be transmitted back to the data service hub 110. Conversely, the digital optical receiver 540 converts optical signals into electrical binary/digital signals so that the electrical data signals can be handled by processor 550. Processor 550 can comprise an application specific integrated circuit (ASIC) in combination with a central processing unit (CPU). However, other hardware or software implementations or combinations thereof are not beyond the scope and spirit of the present invention.

The return path of the present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals that are fed through a first diplex filter 507A to a modulated RF bidirectional signal input/output 535. The RF bidirectional signal input/output 535 can feed the modulated RF bidirectional signals over a coaxial waveguide 509 through another second diplex filter 507B to the video services terminal 117. The video services terminal 117 can be coupled to a tuner 503 that comprises a television set or radio.

The analog optical receiver 525 can process analog modulated RF transmission as well as digitally modulated RF transmissions for digital TV applications, and more specifically, high density television applications (HDTV).

The bi-directional optical signal splitter 520 can direct optical signals in their respective directions. That is, downstream optical signals entering the bi-directional optical splitter 520 from the optical the optical diplexer 515, are propagated to the digital optical receiver 540. Upstream optical signals entering the bi-directional optical splitter 520 from the digital optical transmitter 530 are sent to optical diplexer 515 and then to optical tap 130. The bi-directional optical signal splitter 520 is connected to a digital optical receiver 540 that converts downstream optical signals into the electrical domain. Meanwhile the bi-directional optical signal splitter 520 is also connected to a digital optical transmitter 530 that converts upstream data packet and video control return packet electrical signals into the optical domain.

The digital optical receiver 540 can comprise one or more photoreceptors or photodiodes that convert optical signals into the electrical domain. The digital optical transmitter 530 can comprise one or more lasers such as the Fabry-Perot (F-P) Lasers, distributed feedback lasers, and Vertical Cavity Surface Emitting Lasers (VCSELs). Other types of lasers are within the scope and spirit of the invention.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 560 that can comprise an analog interface. Subscriber telephony equipment 564 can be connected to the telephone input/output 560.

The processor 550 is also connected to a data interface 555 that can provide a link to computer devices, ISDN phones, and other like devices. Alternatively, the data interface 555 can comprise an interface to a Voice over Internet Protocol (VoIP) telephone or Ethernet telephone. The data interface 555 can also comprise one of Ethernet (10BaseT, 100BaseT, Gigabit) interface, a HPNA interface, a universal serial bus (USB) an IEEE1394 interface, an ADSL interface, and other like interfaces. In one preferred exemplary embodiment, the data interface 555 comprises an Ethernet interface that includes a port 566A. The port 566A can comprise a 10BASE-T port, but other ports are not beyond the scope and spirit of the present invention. For example, instead of a 10BASE-T port, the port 566A could comprise a 10/100BaseT port.

Exemplary Processing of Downstream Signals as Illustrated in FIG. 5

Downstream optical signals from optical tap 130 enter on the left of the subscriber optical interface 140, and are supplied to optical diplexer 515 which separates the optical signal into the plurality of wavelengths used for transmission on the optical network system. In the exemplary system, two wavelengths can be used. 1550 nm is used for downstream communications of video and other data signals to be broadcast to all subscribers. This wavelength is supplied to analog optical receiver 525. Meanwhile, 1310 nm can be used for bi-directional communication of baseband digital data. This baseband digital data can carry telephone calls, Internet communications, and other digital data as desired by the user. In the instant invention, the 1310 wavelength region can also carry the upstream video control return signals (that are normally carried in the RF domain in the conventional art). As noted above, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

In the exemplary system, optical diplexer 515 separates the 1550 nm downstream optical signals from the 1310 nm downstream optical signals. The optical diplexer 515 sends the 1550 nm downstream optical signals to the analog optical receiver 525. The output of this analog optical receiver 525 is an electronic signal that looks the same as that from a cable TV HFC plant, with a plurality of video signals, each modulated onto its own frequency. In the instant teaching, the broadcast signals are supplied to a High input (H) of a diplex filter 507A that can separate the downstream broadcast signals from the upstream bi-directional video return control signals, as will be discussed below.

The optical diplexer 515 directs the downstream 1310 nm data signals to the optical splitter 520, and from there, to the digital optical receiver 540 where the downstream optical signals are converted to the electrical domain and handled by the processor 550. The processor can generate upstream electrical signals that are supplied to digital optical transmitter 530. The digital optical transmitter 530 can convert the upstream electrical signals into upstream optical signals operating in the 1310 nm wavelength region, as is understood by those skilled in the art.

From the downstream electrical signals generated by the digital optical receiver 540, the processor 550 can extract data for services such as a telephony service and for data services. The data services can comprise downstream video service control signals of the instant invention. Telephone signals can be interfaced on telephone input/output port 560, meanwhile, the data signals can be interfaced on data interface 555. As noted above, the data interface 555 can comprise one or more Ethernet interfaces. The Ethernet Interface can comprise one of 10BASE-T and 100BaseT interfaces. The data interface 555 may operate in either mode, in which case the data interface 555 can be referred to as a 10/100BaseT interface.

In one embodiment of the invention (not illustrated), the data interface 555 can comprise an external Ethernet switch or router that connects to a single 10/100BaseT interface. This can provide interfaces for subscriber data needs (for example, to connect a computer to the Internet) and it can also provide a port 566A that comprises a 10BASE-T port.

In one preferred and exemplary embodiment of the invention, data interface 555 comprises an extra 10BASE-T port 566 built in, that is used with the invention. Those skilled in the art will recognize a 10BASE-T port 566 can use two pair of unshielded wires, one wire for data in one direction and one wire for data in the other direction. Ethernet systems in general and 10BASE-T connections in particular, typically have good capability to handle collisions and to allow all users fair access to the medium. In other words, the downstream video control service signals as well as the upstream video control return signals can comprise data packets formatted according to a contention network protocol that senses data collisions. One contention network protocol comprises the Ethernet protocol. Carrier detection protocols with collision sense characteristics can be used in the instant invention.

As noted above, the port 566A can comprise a 10BASE-T port which can be over-and-above what is needed to service the subscriber's data network. In other words, port 566A is an additional data service component relative the data interface 555 that can provide other subscriber data services 562. The port 566A feeds the downstream video control service data packets to a modem 568A. The modem 568A can comprise an RF modem that can translate or modulate the downstream video control service data packets that can comprise Ethernet formatted packets.

However, it is noted that the downstream video control signals may either be sent over the normal downstream RF path (that includes analog optical receiver 525, diplex filter 507A, signal output port 535, diplex filter 507B and VST 117), or they may be sent as IP packets interfacing with the port 566A. In the first case where downstream video control signals flow through the analog optical receiver 525, diplex filter 507A, and the signal output port 535 (and not the first RF modem 568A), the RF modem 568A can comprise a single receiver for the Ethernet signal (which has been modulated onto an RF carrier at modem 568A) coming from the VST 117. In other words, for upstream only communications, first RF modem 568A may not include a transmitter section T. Meanwhile, the receiver section R demodulates the signal and interfaces the recovered Ethernet signal with port 566A.

Figure 6:
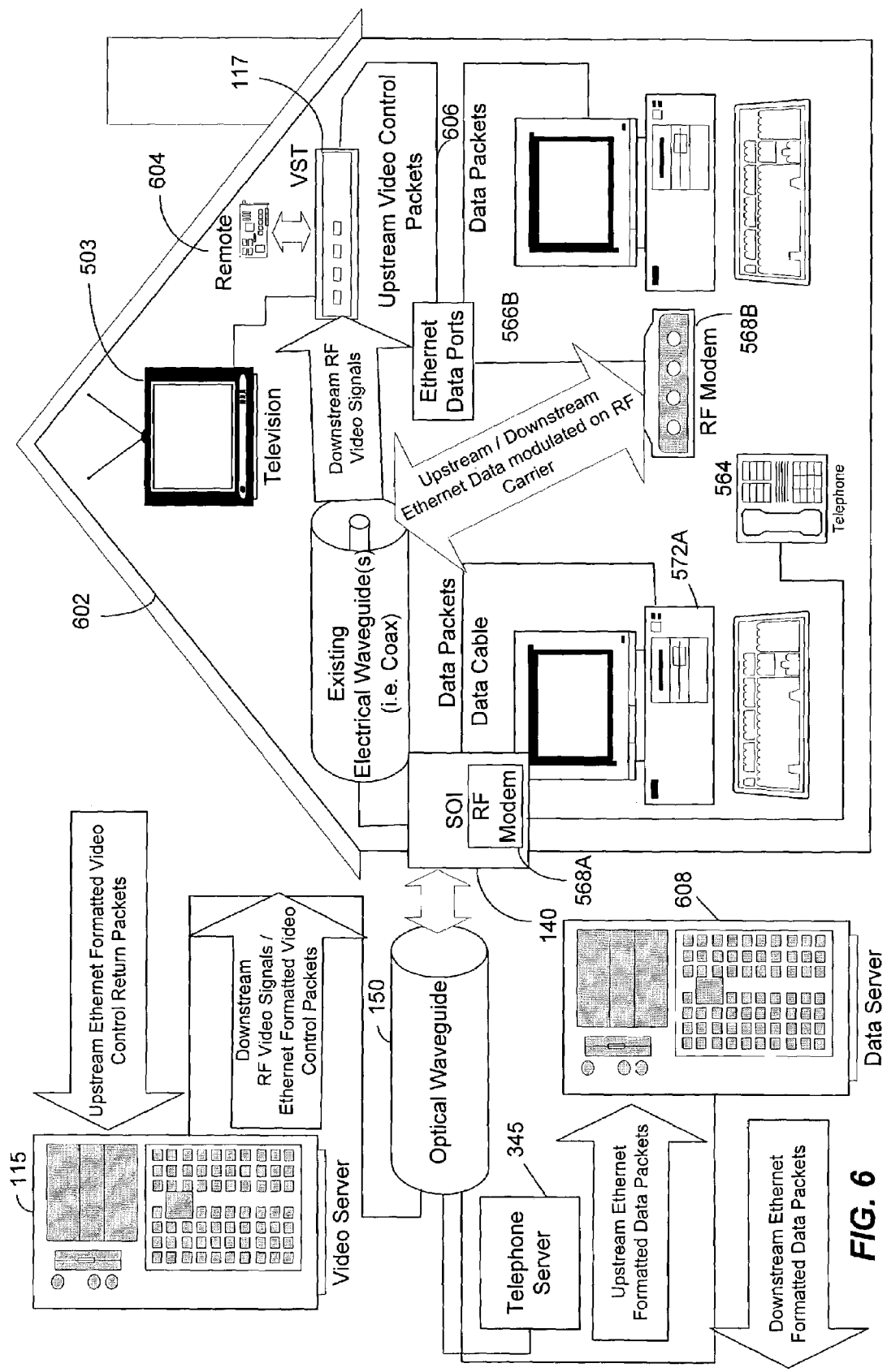
FIG. 6 is a diagram illustrating exemplary components of a video control return path according to a first exemplary embodiment of the present invention.
Figure 7:
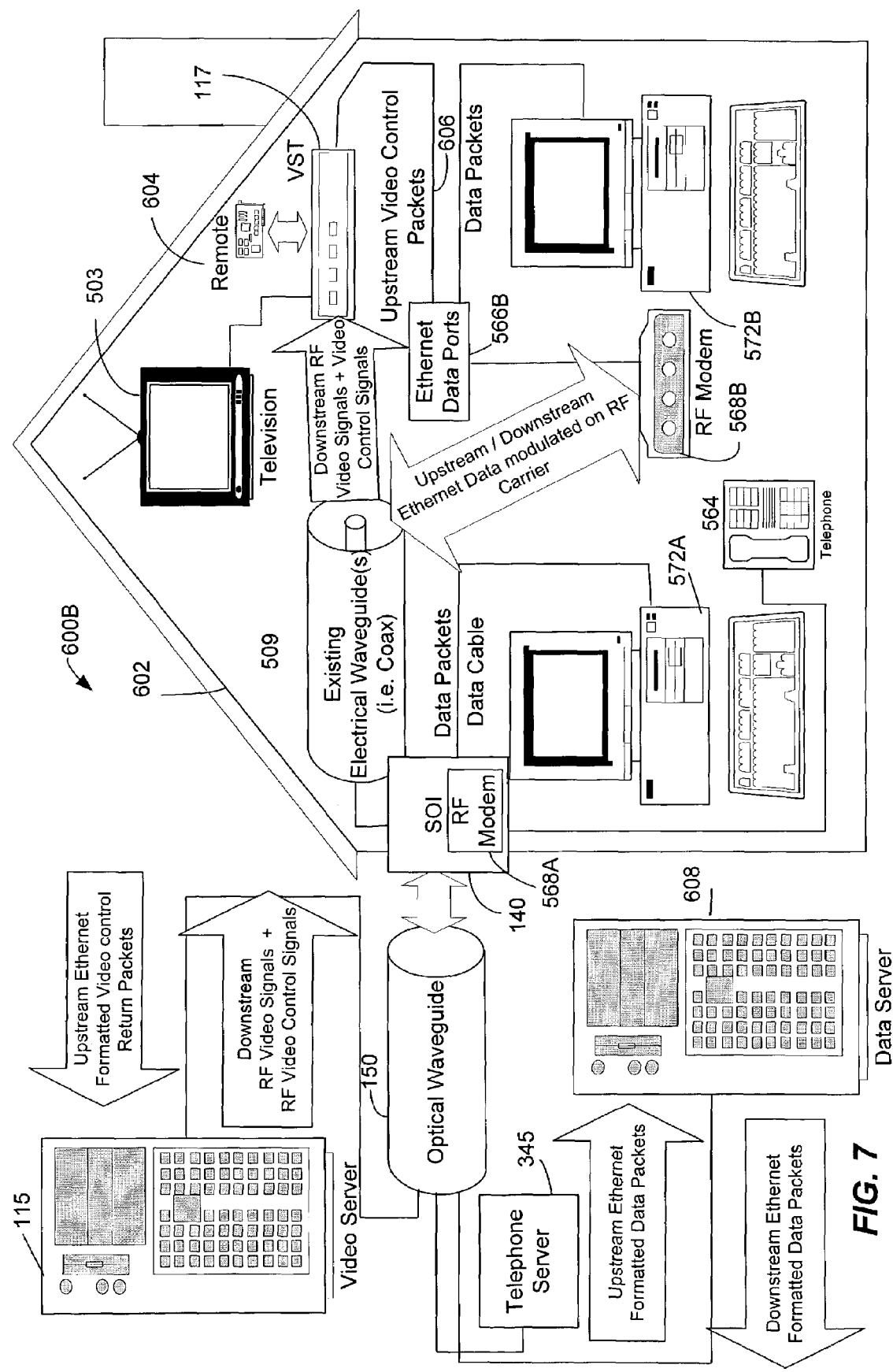
FIG. 7 is a diagram illustrating exemplary components of a video control return path according to a second exemplary embodiment of the present invention.

On the other hand, in the second case where downstream video control packets flow through the processor 550, data interface 555, and port 566A, the RF modem 568A may handle signal in both directions, upstream and downstream, and in this case, it will have both a modulator and a demodulator. FIGS. 6 and 7 illustrate modems that comprise both transmitting sections and receiving sections for supporting bi-directional signal flow for the second case.

This RF carrier can propagate through the low section L of the first diplex filter 507A over an existing electrical waveguide 509 to a data adapter 570 that is connected to a video service terminal (VST) 117. The existing electrical waveguide 509 can comprise a coaxial cable 509 that already exists in a structure. Those skilled in the art recognize that many homes and office buildings are prewired with coaxial cables during construction.

Each VST 117 can be connected to a tuner 503 that can comprise a subscriber's television set. The data adapter 570 connected to the VST 117 via a second port 566B can comprise a second diplex filter 507B and a second modem 568B. The second modem 568B can also comprise an RF modem. Meanwhile, the second port 566B can comprise a 10BASE-T port. According to one exemplary embodiment, this second port 566B can comprise a dual port that supports communications with a computer 572 and the video services terminal 117. The computer 572 can be connected to the second port 566B via a data cable such as a Category 5 cable that supports Ethernet formatted digital communications. However, other types of data cables and other types of ports 566B are not beyond the scope and spirit of the present invention.

The second diplex filter 507B, similar to the first diplex filter 507A in the subscriber optical interface 140, can comprise a high pass (H) and a low pass section (L), both of which are connected to a common point. The common connection point of both diplex filters 507A, 507B is the Signal Input/Output 535. The high pass section (H) of each diplex filter 507 permits broadcast signals to pass from analog optical receiver 525 to the VST 117. Typically in North American applications, the high pass section (H) allows signals between approximately 54 MHz up to about 870 MHz to flow therethrough. The low pass section (L) of each diplex filter 507 can couple the two RF modems 568A, 568B together and typically allows frequencies between approximately 5 to 42 MHz to flow therethrough.

Several exemplary embodiments of RF modems 568 are possible. One practical embodiment is to make these modems conform to the characteristics of the Home Phone Networking Alliance (HPNA, sometimes called Home-PNA), a trade organization that has produced standards supporting transport of data on telephone networks. One standard is the Interface Specification for HOMEPNA™ 2.0 10M8 Technology by the Home Phoneline Networking Alliance, Inc. The difference between the instant invention and the HPNA standard is that, rather than using telephone lines, the invention can use existing coaxial cable through diplex filters. The carrier frequency used in the aforementioned HPNA specification is 7 MHz, which is a convenient frequency to use over the low pass sections (L) of the diplex filters 507A, 507B.

Thus, the RF modems 568 can comprise integrated circuits designed to support the HPNA specification. Bi-directional transmission between the modems 568 can be handled internal to the HPNA protocol, which was designed for use on residential telephone lines but can be used on existing coaxial cables 509 according to one exemplary embodiment of the present invention.

According to another exemplary and practical embodiment, the RF modems 568 can employ 802.11 specifications (LAN/MAN Standards Committee of the IEEE Computer Society, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band). Specifically, the RF modems 568 can be made according to the 802.11 specification noted above with a change in operating frequency. Those of ordinary skill in the art recognize that the 802.11 specification is a set of wireless networking specifications that have become quite popular recently as of the writing of this description. Currently, the two most common specifications in this group are the 802.11b and 802.11a specifications.

However, other variations of these specifications do exist in the art. The 802.11b specification can operate at about 2.4 GHz, with an occupied bandwidth of +/−22 MHz. Therefore, the 802.11b would not be a preferred embodiment as it doesn't quite fit in the spectrum available. However, in a practical sense, enough signal will get through to make the system work. In order to use these specifications in the instant invention, the frequency is usually changed from 2.4 GHz to about 22.5 MHz, so that most of the sidebands will fit in the spectrum available.

Overview of Exemplary Embodiments

Referring now to FIG. 6, this Figure is a diagram illustrating exemplary components of a video control return path 600A according to a first exemplary embodiment of the present invention. This Figure provides a high level overview of the operation of the present invention and therefore, it omits many of the detailed components discussed above in order to emphasize the main concepts of the technology. For example, FIG. 6 omits the internet router 340, the laser transceiver node 120 as well as optical taps 130 and diplexers 507 just to name a few components.

However, FIG. 6 does show the advantages of the system where existing electrical waveguides 509 such as coaxial cables of a structure 602 can be used in a portion of the return path in order to eliminate any rewiring or damage to the structure 602. FIG. 6 also describes the type of communications that can supported along each portion of the return path. For example, downstream RF video signals can be received by the video service terminal 117 that can send these signals to the tuner 503 that can comprise a television set. A remote control transmitter 604 can produce video service control return signals such as "Play" or "Stop" commands for video-on-demand services. The video control return signals can be received by the VST 117 that can convert these signals to video control return packets. The video control return packets can be propagated along a data cable 606 that may comprise a category 5 type data cable.

The video control return packets can be fed into the data port 566B that can comprise an Ethernet data port. In addition to the video control return packets, the data port 566B can also receive data packets from a computer 572B. The video control return packets as well as the data packets can then be modulated onto an RF carrier according to a transmitting section of a RF modem 568B.

The RF carrier is propagated over the existing electrical waveguide 509 that may comprise a coaxial cable. However, other existing electrical waveguides 509 can include, but are not limited to, telephone wires using the HPNA or various ADSL standards), and power wires using the Homeplug standard). In other exemplary embodiments, wireless modems 568 could be used that may employ some forms of the 802.11 standard.

The RF carrier is received by a modem 568A housed within a subscriber optical interface 140. The modem 568A can demodulate the RF carrier to extract the video control return packets as well as any other data packets coming via RF modem 568B. The subscriber optical interface 140 (via the processor 550, not illustrated) can mix additional data packets received from another computer 572A as well as from telephony equipment 564 such as a phone with the upstream packets received from the modem 568A. The upstream packets from the modem 568A as noted above can comprise the video control return packets and the data packets generated by the computer 572B connected to the data port 566B adjacent to the VST 117.

The subscriber optical interface 140 (via the digital optical transmitter 530, not shown) can convert all of the data packets to the optical domain and then propagate the packets over the optical waveguide 150 towards the data service hub 110 (not shown) that comprises the video services controller 115 and a data server 608. The data server 608 can receive the upstream data packets generated by the computers 572A, 572B while the telephone switch 345 can receive the packets generated by the subscriber telephony equipment 564.

The video server 115 can receive the upstream video control return packets that can comprise the "Play", "Stop", or "Pause" commands. In response to these commands, the video server can generate downstream RF video signals that are responsive to these commands as well as downstream video service control packets. For example, the downstream RF video signals can comprise video that is now "stilled" or "paused" in response to a "Pause" upstream video control return data packet. Further, the downstream video service control packet can comprise a command to direct the VST 117 to display the word "Paused" on the television set 503.

The downstream video service control packets are combined with downstream data packets from the data server 608. All of the downstream packets and downstream RF signals are converted to the optical domain (by the equipment in both the data service hub 110 and laser transceiver node 120 not shown) and propagated over the optical waveguide 150 to the subscriber optical interface 140. The subscriber optical interface 140 converts the downstream optical RF video signals into the electrical domain. The subscriber optical interface (via the processor 550 not shown) also separates the video service control packets from some of the data packets. The video service control packets and some data packets are modulated onto an RF carrier by the modem 568A.

The RF carrier as well as the downstream RF video signals are propagated over the electrical waveguide 509 that can comprise existing coaxial cable. The downstream RF video signals are received by the VST 117 that can forward them to the tuner 503 comprising a television set. Meanwhile, the RF carrier comprising the video service control packets and some of the data packets are demodulated by the RF modem 568B. The data packets are sent to the computer 572B while the video service control packets are forwarded to the VST 117. The VST 117 can extract the commands from the video service control packets such as the "pause" command noted above.

Referring now to FIG. 7, this figure is diagram illustrating exemplary components of a video control return path according to a second exemplary embodiment of the present invention. FIG. 7 has several features similar to FIG. 6, and therefore, only the differences between these two figures will be discussed.

In FIG. 7, instead of generating downstream digital video service control packets, the video server 115 (located in the data service hub 110, not shown) produces analog RF video service control signals. In this way, the downstream analog RF video service control signals follow the same downstream path as the downstream analog RF video signals. Specifically, the downstream analog RF video service control signals are simply converted into the electrical domain at the subscriber optical interface and propagated over the existing electrical waveguide 509 with the downstream analog RF video signals. Both sets of signals are sent directly to the VST 117 without flowing through the modems 568.

Meanwhile, the VST 117 of FIG. 7 still generates upstream video control return packets identical to what is taught in FIG. 6 above. FIG. 7 basically illustrates conventional RF downstream control for the VST 117 that can follow either the DVS 167 or DVS 178 standards, for example, while using only the upstream return path comprising the modems 568. In this exemplary embodiment illustrated in FIG. 7, collisions between upstream data packets from different VSTs 117 could occur, but the set top control protocols taught in DVS 167 and DVS 178 can handle these possible collisions themselves. In summary, the downstream video service control signals of FIG. 7 are transported via analog communications while the upstream video control return signals are transported via digital communications such as data packets that are modulated and demodulated with the modems 568, and according to one exemplary embodiment, as Ethernet packets. Also, in this exemplary embodiment, the RF modem 568B adjacent to the VST 117 would only need a transmitting section T and the RF modem 568A within the subscriber optical interface 140 would only need a receiver section R to support unidirectional data flow.

Referring generally to FIGS. 8–11, these figures describe some of the discrete circuitry that can be used in the transmitter sections T and receiver sections R of the modems 568. These figures do not reflect the use of any standards such as HPNA discussed above. If standards were used to modulate/demodulate the data of the present invention, one of ordinary skill in the art would substitute the circuitry illustrated in the figures with conventional circuitry that can support such standards.

Figure 8:
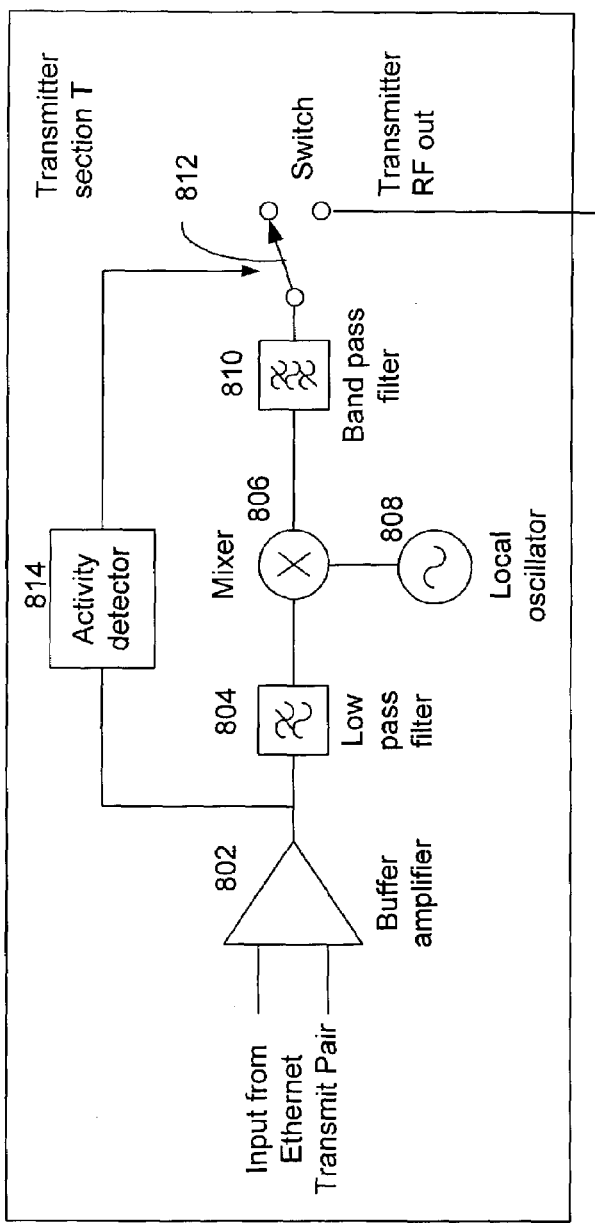
FIG. 8 is a functional block diagram illustrating some components of a transmitter section of a modem according to a first exemplary embodiment of the present invention.

Referring now to FIG. 8, this Figure is a functional block diagram illustrating some components of an RF transmitter section T of a modem 568 according to a first exemplary embodiment of the present invention. As noted above, the data interface 555 (not shown) and each VST 117 can comprise an Ethernet 10BASE-T interface. An Ethernet 10BASE-T interface further comprises a transmit pair and a receive pair, which carry differential signals, as is understood by those skilled in the art. The transmit pair of a respective Ethernet 10BASE-T interface found on both the data interface 555 and VST 117 can be coupled to buffer amplifier 802 which converts the balanced signal to a single-ended signal at logic levels.

A low pass filter 804 provides spectral shaping as will be described below. A mixer 806 can modulate a downstream video service control packets/data packets or upstream video control return packets/data packets onto an RF carrier produced by a local oscillator 808, using bi-phase shift keying (BPSK), a modulation format well-known to those skilled in the art. In a BPSK system, the phase is shifted one-hundred-eighty degrees between transmission of a zero and a one of a digital signal. With BPSK, the bandwidth occupied by the RF carrier is twice the modulating frequency, as is the case with conventional double side-band amplitude modulation.

Bandpass filter 810 works in conjunction with low pass filter 804 to provide the over-all spectral shaping as described below. After the bandpass filter 810, the RF carrier is applied to a switch 812 that is controlled by an activity detector 814. In one exemplary embodiment, the activity detector 814 is only present in the modem 568B of the data adapter 570. In another exemplary embodiment, the activity detector 814 be present in the modem 568A of the subscriber optical interface 140 in addition to the activity detector present in the modem 568B of the data adapter 570.

When activity detector 814 detects activity on the output of buffer amplifier 802, it closes the switch 812 to an opposite position from that shown in FIG. 8 such that the RF carrier can be propagated out of the transmitter section T. This control of the switch 812 can prevent the transmitting section T of each modem 568 from generating any noise that could interfere with other RF carriers that may be propagating over the coaxial cable 509. Other RF carriers that could be propagating over the coaxial cable 509 could include downstream video service signals that can be viewed with the tuner 503 that could comprise a television.

The activity detector 814 for can comprise a retriggerable one-shot circuit which activates when the buffer amplifier 814 output first goes high, and which resets if its input gets no transitions for a set length of time. Such circuits are known to those of ordinary skill in the art. The switch 812 and activity detector 814 are usually present in the modem 568B of data adapter 570 because more than one VST 117 may be present in a structure such as a home and where multiple VSTs 117 may be using the same return path or channel. If each transmitter section T were connected to the coaxial cable continuously, then the two VSTs 117 could interfere with each other.

Figure 9:
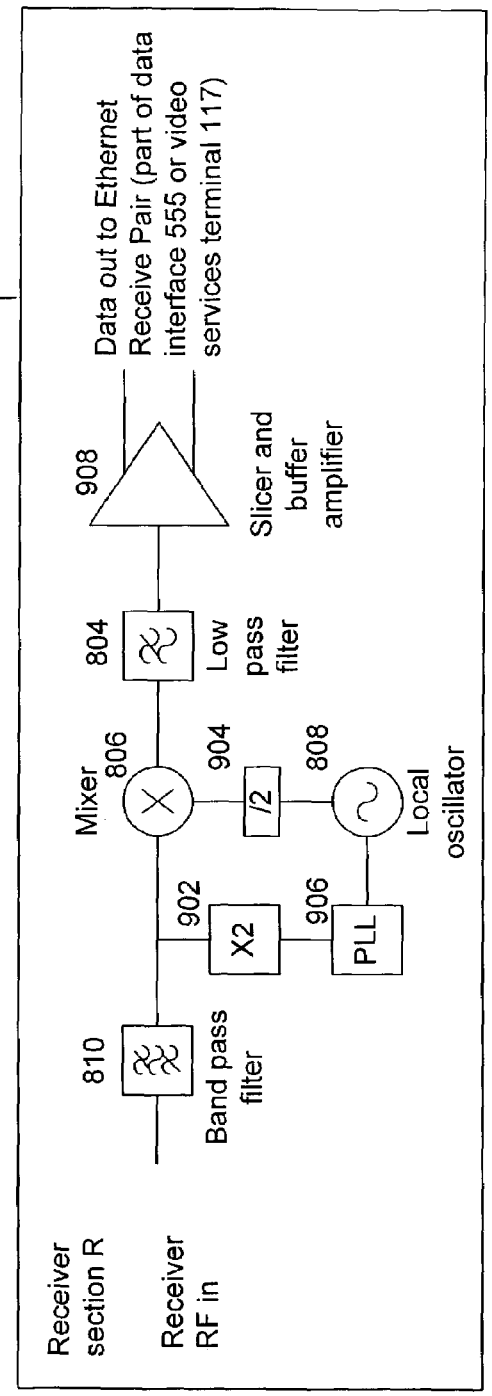
FIG. 9 is a functional block diagram illustrating some components of a receiver section of a modem according to a first exemplary embodiment of the present invention that can communicate with the transmitter section of FIG. 8.

Referring now to FIG. 9, this Figure is a functional block diagram illustrating some components of a receiver section R of a modem 568 according to a first exemplary embodiment of the present invention that can communicate with the transmitter section T of FIG. 8. The receiver section R can comprise a bandpass filter 810, which can filter out-of-band frequencies. A multiplier 902 can double the RF carrier frequency and can supply the doubled carrier frequency to a phase locked loop 906. The phased locked loop 906 can cause the local oscillator 808 to oscillate at twice the incoming carrier frequency.

The output of local oscillator 908 is divided by two in divider 904 and supplied to a mixer 806 which can extract the data packet. The output of mixer 806 is a baseband signal, which is supplied to low pass filter 904 and then to a slicer and buffer amplifier 908. The output of amplifier 908 is the contention protocol formatted data packet such as an Ethernet data packet.

According to one exemplary embodiment, the video service control packets, the video control return packets, and data packets comprise a 10BASE-T Ethernet signal. The 10BASE-T Ethernet signal comprises a 10 Mb/s signal. When using the 802.3 standard, this 10BASE-T signal is encoded with Manchester encoding which can provide several advantages. First, such a signal can remove any direct-current (dc) component in the signal. Second, with Manchester encoding, the 10BASE-T signal provides for self clocking of the data so that the expense of a clock recovery circuit is avoided and the network can operate asynchronously.

But with Manchester encoding, the bandwidth of the 10BASE-T signal may be doubled as is understood by those of ordinary skill in the art. Thus, the effective wire rate (the data rate actually measured) is 20 Mb/s. As is understood by those of ordinary skill in the art, a BPSK signal has a bandwidth efficiency of 1 bit per hertz, so that the bandwidth required for the signal of the present invention is approximately 20 MHz.

While it is possible to transmit in only one direction and use the same RF frequency for both directions over the coaxial cable 509, it is more straightforward to use two frequencies, one for downstream (from the subscriber optical interface 140 to the VST 117) and one for upstream (from the VST 117 to the subscriber optical interface 140). This would require a total of 40 MHz minimum for the RF carrier, yet only 42–5=37 MHz is available in the normal so-called sub-low band, which would be a good place to work. There are several solutions to this dilemma.

One can take advantage of the fact that the BPSK signal is quite robust and can withstand a lot of interference and noise, so one can provide for downstream transmission at about 13 MHz for the RF carrier, meaning that the lower sideband will extend below 3 MHz, and the upper sideband will extent to about 23 MHz, with the addition on each side of excess filter bandwidth of maybe 20%. The upstream direction RF carrier could be transmitted at about 35 MHz, with the upper sideband falling at 45 MHz (plus about 20% for filter response), and the lower sideband falling at 25 MHz (lowered by the excess filter bandwidth).

Yet another exemplary embodiment can include not using a so-called sub low band (below 42 MHz in North America) for the RF carrier and using two channels above it. This exemplary embodiment would open up the spectrum from 88–120 MHz. The spectrum from 88–120 MHz could be used for the upstream direction RF carrier, while a frequency around 22.5 MHz is used for the downstream direction RF carrier, or vice versa. This would ease filter requirements, while consuming some bandwidth that otherwise might be used for other purposes.

According to a third alternative exemplary embodiment, the spectrum above the high end of the broadcast spectrum could be used either for transmission in both directions, or in one direction. For example, according to one preferred and exemplary embodiment of the present invention, TV signals are propagated at frequencies up to 870 MHz. A frequency of, for example, 900 MHz could be used for the downstream direction, whereas 22.5 MHz could be used for upstream transmission or vice versa.

While FIG. 5 illustrates diplexers 507A, 507B that may use the 13 MHz and 35 MHz frequencies region (or approximately in that range), those of ordinary skill in the art will recognize that the other frequency bands mentioned could be used with appropriate modification of the diplex filters.

The data interface 555 and VSTs 117 comprising the Ethernet 10BASE-T interfaces are designed to operate in a network with architectures similar to this one, where the subscriber optical interface 140 can serve as the repeater in a small Ethernet network. It is assumed in the network of the present invention that one user can "hear" other users only through the repeater (subscriber optical interface 140) which may echo back that which is transmitted from any one VST 117.

Operation of a repeater in an Ethernet half duplex network is generally explained in section 1.4.232 of the IEEE 802.3 specification, which governs modern Ethernet systems. Section 1.4.232 of the IEEE 802.3 specification is hereby incorporated by reference. By using two different frequencies for the two directions (upstream and downstream communications), the network is logically turned into a "wired star topology" in the terms of IEEE 802.3 standard.

Figure 10:
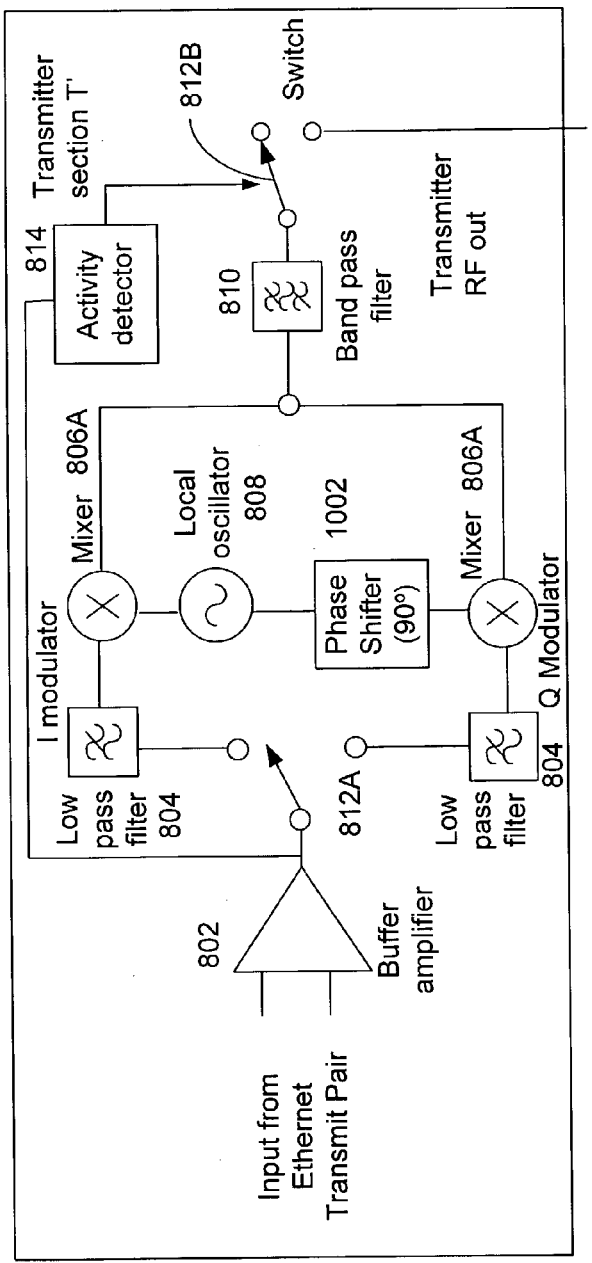
FIG. 10 is a functional block diagram illustrating some components of a transmitter section of a modem according to a second exemplary embodiment of the present invention.

Referring now to FIG. 10, this figure is a functional block diagram illustrating some components of a transmitter section T' of a modem 568 according to a second exemplary embodiment of the present invention. This transmitter section T' supports quadrature phase shift keying (QPSK) known to those of ordinary skill in the art. QPSK improves spectral efficiency by transmitting more than one bit at a time. The present invention is not limited to QPSK modulation and BPSK modulation techniques. Other modulation techniques include, but are not limited to, quadrature amplitude modulation, Vestigial sideband (VSB), and other like modulation techniques.

The transmitter section T' of this exemplary embodiment has components similar to the components of the transmitter section T illustrated in FIG. 8. Therefore, only the differences between the transmitter sections will discussed below with respect to FIG. 10.

The transmit pair of a respective Ethernet 10BASE-T interface found on both the data interface 555 and VST 117 can be coupled to buffer amplifier 802 which converts the balanced signal to a single-ended signal at logic levels. The signal is split into two channels with a first switch 812A: an in-phase channel I (above the buffer amplifier 802) and a quadrature channel Q (below the buffer amplifier 802). Two bits of the signal are transmitted simultaneously, one in each channel. Spectral efficiency with QPSK modulation is improved because the spectrum required to transmit the two bits is no wider than the spectrum required to transmit one bit using BPSK modulation.

Each bit is filtered with low pass filters 804 and then modulated onto the an RF carrier via the mixers 806A, 806B at the same frequency but at different phases. The phase shifter 1002 can produce the phase shift for the signal fed out of the local oscillator 808 towards the mixer 806B of the Q channel. With this phase shift by the phase shifter 1002, the phase of the I channel is ninety degrees apart, or "in quadrature", relative to the phase of the Q channel. The two channels are then combined and are further filtered by band pass filter 810. The transmitter section T of this exemplary embodiment also comprises an activity detector 814 that functions similar to the activity detector illustrated in FIG. 8.

Figure 11:
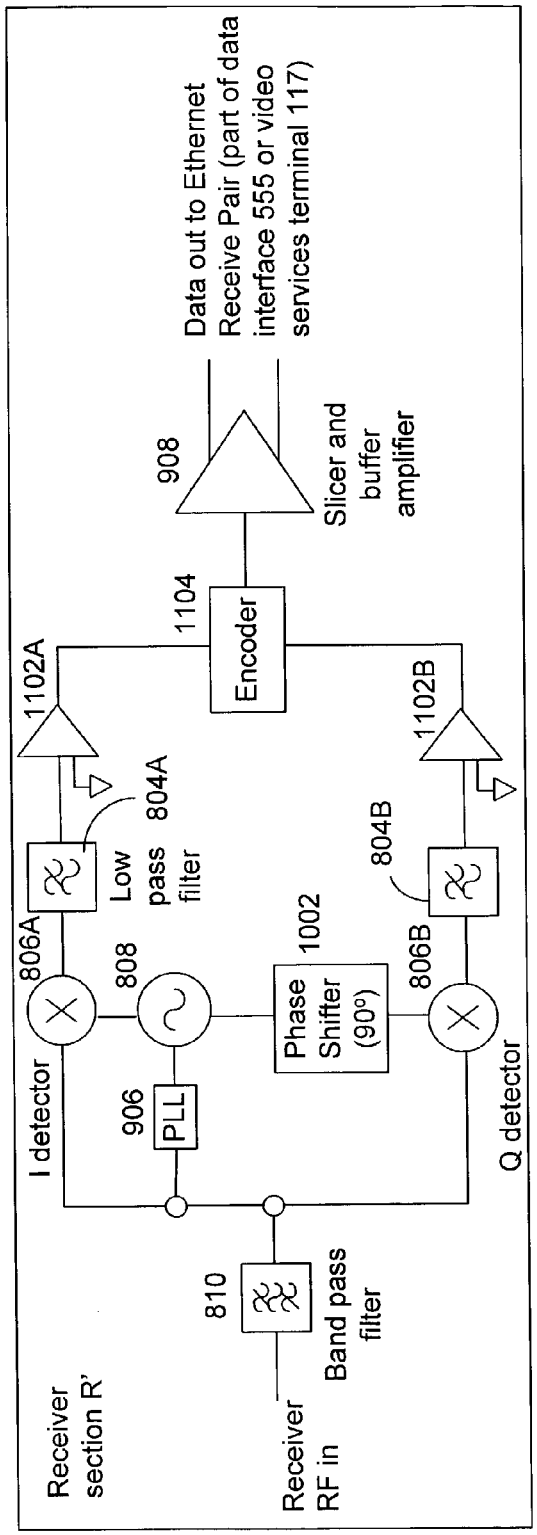
FIG. 11 is a functional block diagram illustrating some components of a receiver section of a modem according to a second exemplary embodiment of the present invention that can communicate with the transmitter section of FIG. 10.

Referring now to FIG. 11, this figure is a functional block diagram illustrating some components of a receiver section R' of a modem 568 according to a second exemplary embodiment of the present invention that can communicate with the transmitter section T' of FIG. 10. This receiver R' supports quadrature phase shift keying (QPSK) known to those of ordinary skill in the art.

The transmitter section T' of this exemplary embodiment has components similar to the components of the transmitter section T illustrated in FIG. 9. Therefore, only the differences between the transmitter sections will discussed below with respect to FIG. 11.

The receiver section R can comprise a bandpass filter 810, which can filter out-of-band frequencies. The phased locked loop (PLL) 906 sets the local oscillator 808 to the incoming RF carrier frequency. The RF carrier is split into the in-phase I and quadrature Q components. The in-phase I signal is demodulated with mixer 806A while the Q signal is demodulated with the mixer 806B. Both the in-phase I signal and the Q signal are filtered with low pass filters 804A, 804B and are then fed to respective amplifiers 1102A, 1102B where the signals are amplified. An encoder 1104 combines the two bits from the I and Q channels. These signals are then filtered with a low pass filter 804 and fed to the slicer and buffer amplifier 908.

The slicer and buffer amplifier 908 then outputs the contention protocol formatted data packet such as an Ethernet data packet. As noted above, because Manchester encoding is used, the data packets formatted according to the 10BASE-T Ethernet standard provides for self clocking of the data so that the expense of a clock recovery circuit is avoided in this receiver section R' such that network communications can operate asynchronously.

Figure 12:
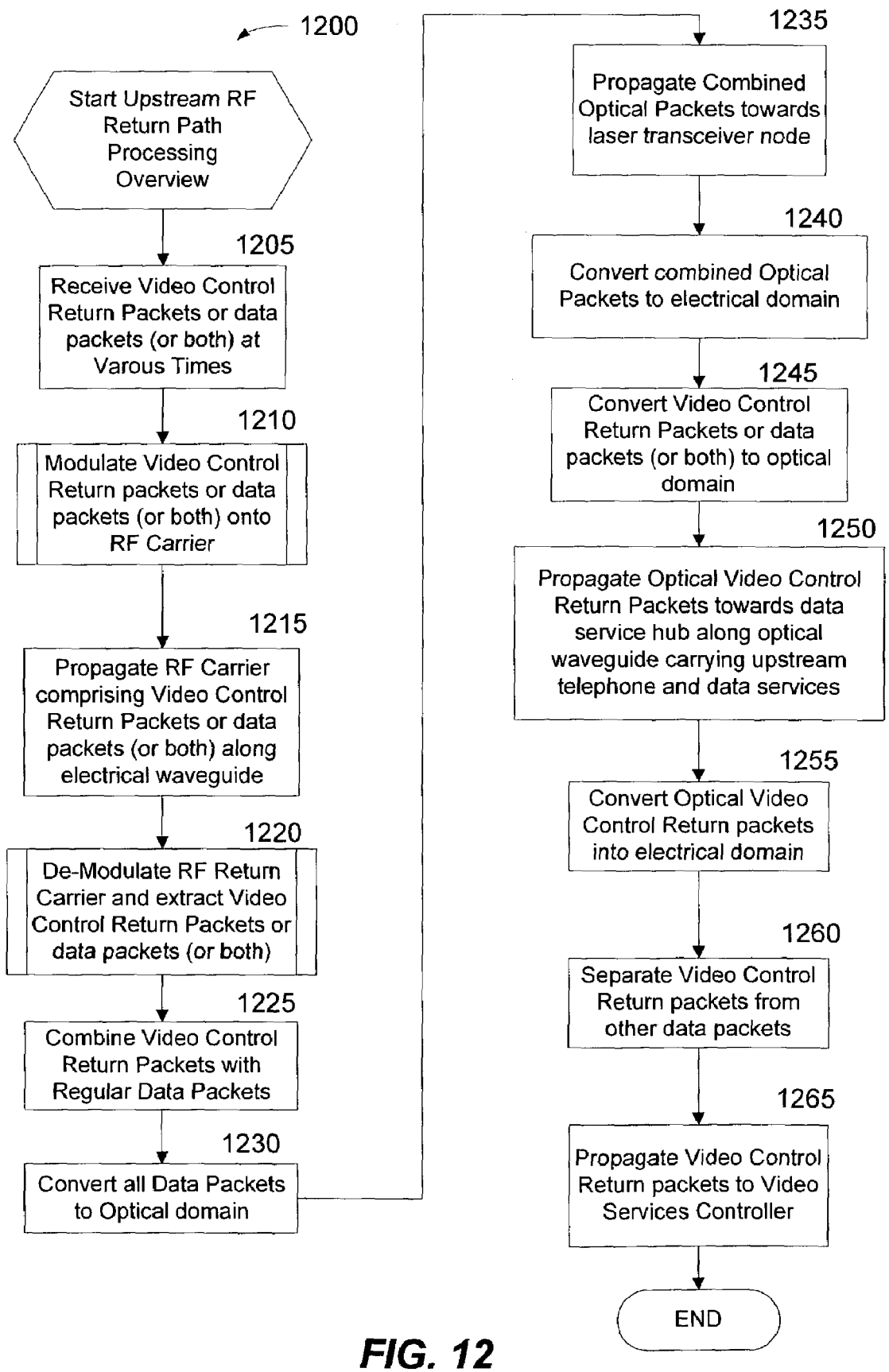
FIG. 12 is a logic flow diagram illustrating an exemplary method for propagating upstream video control return signals towards a data service hub.

Exemplary Methods for Supporting Upstream and Downstream Communications Over Existing Electrical Waveguides Referring now to FIG. 12, this figure is a logic flow diagram illustrating an exemplary method 1200 for propagating upstream video control return packets towards a data service hub. The processes and operations describe below may include the manipulation of signals by a processor and the maintenance of these signals within data structures resident in one or more memory storage devices. For the purposes of this discussion, a process is generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Again, referring now to FIG. 12, this Figure provides an overview of the processing performed by the VSTs 117, modems 568, subscriber optical interfaces 140, laser transceiver nodes 120, and data service hub 110. Step 1205 is the first step in the exemplary upstream overview process 1200. In step 1205, terminal input or data packets from a computer 572B can be received at various times. The terminal input can comprise video control return packets that are received at a video service terminal 117. According to one exemplary embodiment, the terminal input can further comprise video control return packets formatted according to a contention network protocol such as the Ethernet standard. In other words, the video control return packets can comprise Ethernet packets.

Next, in routine 1210, the terminal input or data packets from computer 572B (or both) can be modulated onto an RF carrier towards the subscriber optical interface 140. Routine 1210 generally corresponds with that transmitter section T of the RF modems 568. Further details of routine 1210 will be discussed below with respect to FIGS. 13 and 14.

After routine 1210, in step 1215, the RF carrier comprising the video control return packets or data packets from computer 572B (or both) are propagated along existing electrical waveguides 509 of structure 602. According to one exemplary embodiment, the electrical waveguides 509 can comprise coaxial cables of structure 502.

Next, in routine 1220, the RF carrier is demodulated to extract the data packets or terminal input that comprises the upstream video control return packets. Routine 1220 generally corresponds with the processing performed by the receiver section R of the RF modems 568 described above. Further details of routine 1220 will be described below with respect to FIGS. 15 and 16.

In step 1225, the video control return packets and first data packets from computer 572B are combined with second data packets that may originate from another computer 572A, subscriber telephony equipment 564, or the like. In step 1230, the combined data packets are converted to the optical domain at the subscriber optical interface 140. Next, in step 1235, the combined optical data packets are propagated towards the laser transceiver node 120 along an optical waveguide 150.

In step 1240, the combined optical data packets are converted to the electrical domain with a digital optical receiver such as the receiver 370 of the laser transceiver node 120 as illustrated in FIG. 4. This conversion of the optical packets to the electrical domain in the laser transceiver node 120 occurs because the laser transceiver node 120 is combining data received from multiple groups of subscribers with the optical tap routing device 435. Next, in step 1245, the optical data packets are converted back to the optical domain by an optical waveguide transceiver 430 of the laser transceiver node 120.

In step 1250, the combined optical data packets that comprise data packets and the video control return packets are propagated upstream towards a data service hub 110 along the optical wave guide 170. In step 1255, the optical data packets are converted back to the electrical domain with the optical receivers 370 at the data service hub 110.

In step 1260, the video control return packets are separated from the regular upstream data packets with either the internet router 340 or laser transceiver node routing device 355 of the data service hub. In step 1265, the upstream video control return packets are propagated to the video services controller 115.

Figure 13:
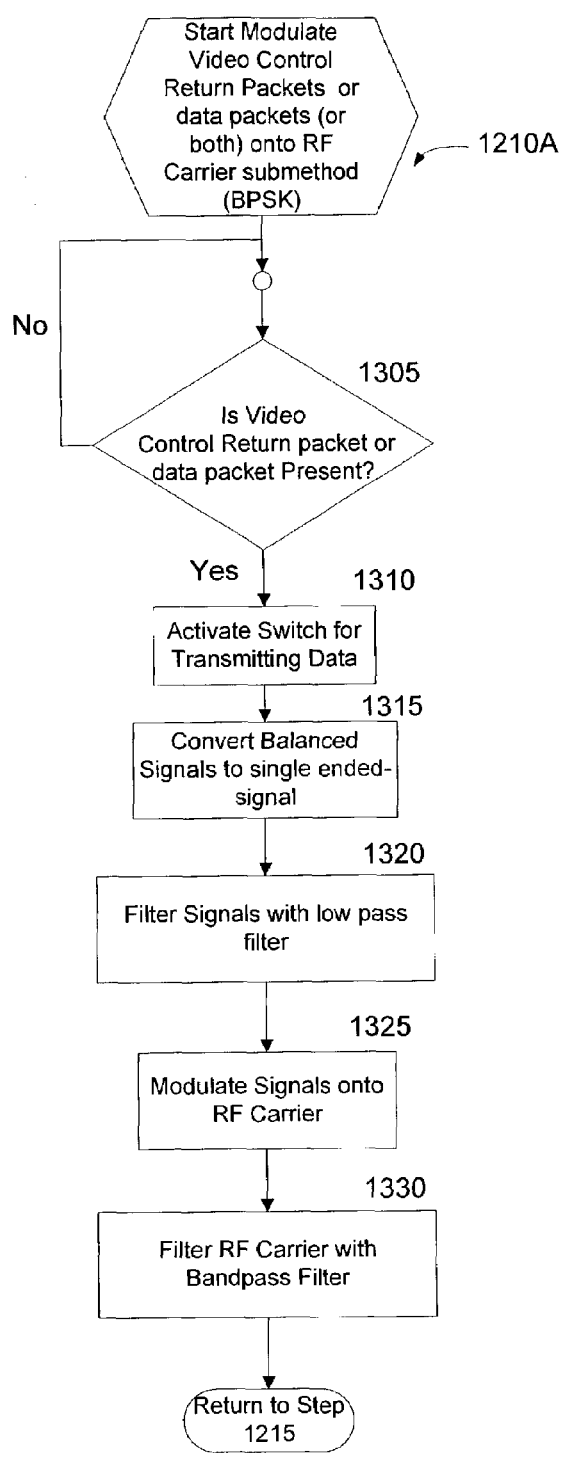
FIG. 13 is a logic flow diagram illustrating a method for modulating video control return packets onto a radio-frequency (RF) carrier that corresponds with transmitter section of FIG. 8 according to one exemplary embodiment of the present invention.

Referring now to FIG. 13, this Figure is a logic flow diagram corresponding to the hardware of FIG. 8 and exemplary submethod 1210A of FIG. 12 for modulating the video control return data packets or data packets from computer 572B (or both) onto an RF carrier using BPSK modulation. Step 1305 is the first decision step of the submethod 1210A in which the activity detector 814 determines if a video control return packet or a data packet (or both) are present.

If the inquiry to the decision step 1305 is negative, then the "No" branch is followed back to step 1305 in a continuous loop. In this way, the switch 812 remains closed such that the transmitting section T of the modem 568 does not produce any RF noise on the electrical waveguide 509.

If the inquiry to decision step 1305 is positive, then the "Yes" branch is followed to step 1310 in which the activity detector 814 throws the switch 812 to a position where the transmitting section T is connected to the electrical waveguide 509. Next, in step 1315, the balanced video control return packets or data packets (or both) are converted to single-ended signals at logic levels with the buffer amplifier 802.

In step 1320, the signals are filtered with the low pass filter 804 to provide spectral shaping. In step 1325, the filtered signals that can comprise downstream video service control packets/data packets or upstream video control return packets/data packets are modulated onto an RF carrier by a mixer 806 that uses an RF carrier produced by a local oscillator 808. Next, in step 1230, the RF carrier is filtered with a band pass filter to perform additional spectral shaping. The process then returns to step 1215 of FIG. 12.

Figure 14:
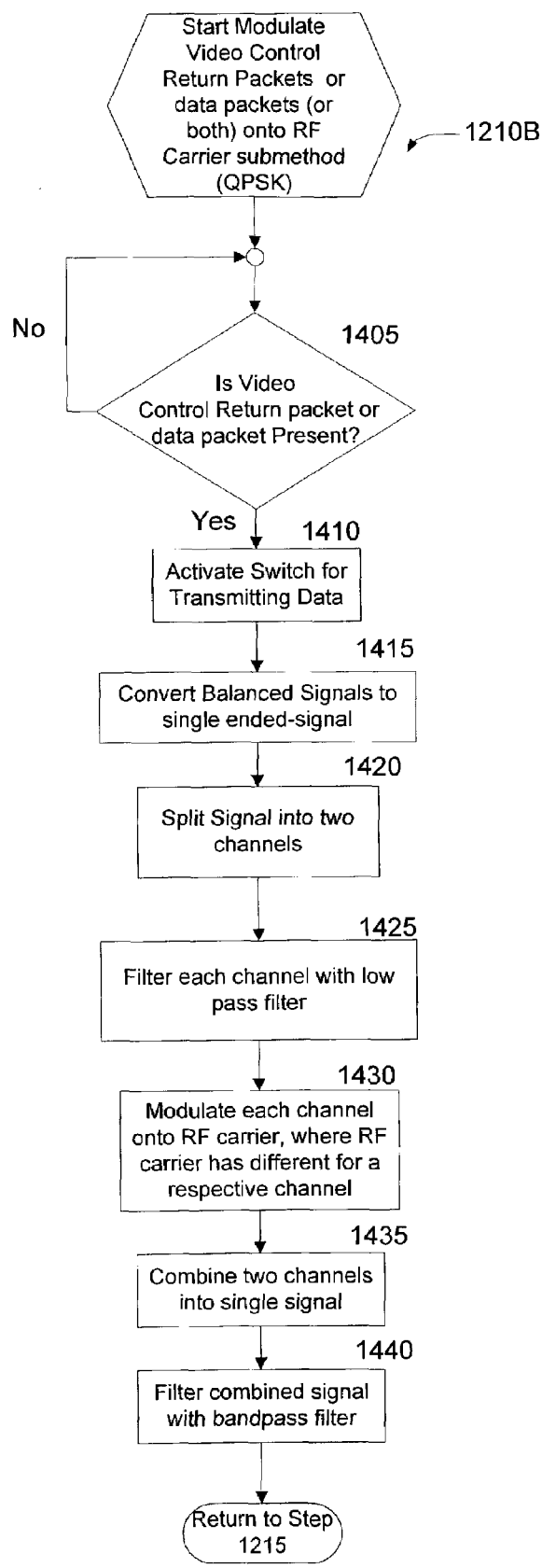
FIG. 14 is a logic flow diagram illustrating a method for modulating video control return packets onto a radio-frequency (RF) carrier that corresponds with transmitter section of FIG. 10 according to another exemplary embodiment of the present invention.

Referring now to FIG. 14, this figure is a logic flow diagram illustrating an exemplary method for modulating video control return packets and data packets onto an RF carrier. The steps illustrated in FIG. 14 generally correspond to the transmitter section T of modem 568 that supports quadrature phase shift keying (QPSK) known to those of ordinary skill in the art.

Decision step 1405 is the first step of the exemplary method 1210B in which it is determined whether a video control return packet or data packet is present at the RF modem 568. If the inquiry to decision step 1405 is negative, then the "no" branch is followed back through a continuous loop that returns to decision step 1405. When the inquiry to decision step 1405 is negative, this means that switch 812 is maintained in an "off" position such that the transmitting section T does not generate any spurious RF signals over the existing electrical wave guide 509, as described above with respect to FIG. 13. If this inquiry to decision step 1405 is positive, then "yes" branch is followed to step 1410 in which the switch 812 is activated.

In step 1415, the buffer amplifier 802 converts the balanced signal comprising packets formatted according to a contention network protocols such as the Ethernet to single-ended signals at logic levels. Next, in step 1420 the single-ended signals are split into two channels. In step 1425 each channel is filtered with a low pass filter 804.

In step 1430, the signals of each channel are modulated onto RF carrier with different phases. In other words the RF carrier for the first channel has a first phase while the RF carrier of the second channel has a second phase. In step 1440, the two channels are combined together. And in step 1445, the combined signals are filtered with a band pass filter 810. The process then returns to step 1215 of FIG. 12.

Referring now to FIG. 15, this figure is a logic flow diagram illustrating a method 1220 for demodulating video control return packets or data packets from a radio-frequency (RF) carrier that corresponds with the receiving section of FIG. 9 that supports BPSK demodulation according to one exemplary embodiment of the present invention.

Step 1505 is the first step of method 1220 in which the incoming RF carrier is filtered by a band pass filter to eliminate out-of-band frequencies. Next, in step 1510, the multiplier 902 can double the RF carrier frequency. In step 1515, the multiplier supplies the doubled carrier frequency to a phase locked loop 906. In step 1520, the phase locked loop 906 can set the local oscillator 808 to oscillate at twice the incoming carrier frequency.

In step 1525, the output of local oscillator 908 is divided by two in divider 904. In step 1530, the RF carrier is mixed with the output of the divider 902 in order to extract the data packets from the RF carrier. In step 1535, the output of mixer 806, a baseband signal, is supplied to low pass filter 904. And in step 1540, the baseband signal is transformed back into a balanced signal with the slicer and buffer amplifier 908. The output of amplifier 908 is the contention protocol formatted data packet such as an Ethernet data packet. The submethod ends and the process returns to step 1225 of FIG. 12.

Referring now to FIG. 16, this figure is a logic flow diagram illustrating an exemplary method 1220B for demodulating an RF carrier according to quadrature phase shift keying (QPSK) known to those of ordinary skill in the art. These steps illustrated in FIG. 16 generally correspond with the receiving section R' illustrated in FIG. 11.

Step 1605 is the first step of the process 1210B in which an RF carrier is received and filtered with a band pass filter in order to remove any out-of-band frequencies. In step 1210, the RF carrier is split into two channels. Next, in step 1615, a signal of one of the two channels is sampled to set a phased-locked loop (PLL).

In 1620, the local oscillator 808 is set to the output of the phase locked loop 906. In step 1630, the RF carrier is mixed with the divided oscillator output to extract the video control return packets and data packets for each respective channel. In step 1630, each channel is filtered with a low pass filter 804.

In step 1635, each channel is amplified with a respective amplifier 1102A, 1102B. In step 1640, the two channels are then combined together with an encoder 1104. In step 1645, the combined signal is fed to a slicer and buffer amplifier 908 where the single-ended signal is converted back to a balanced signal comprising contention protocol formatted data packets. The process then returns to step 1225 of FIG. 12.

Figure 17:
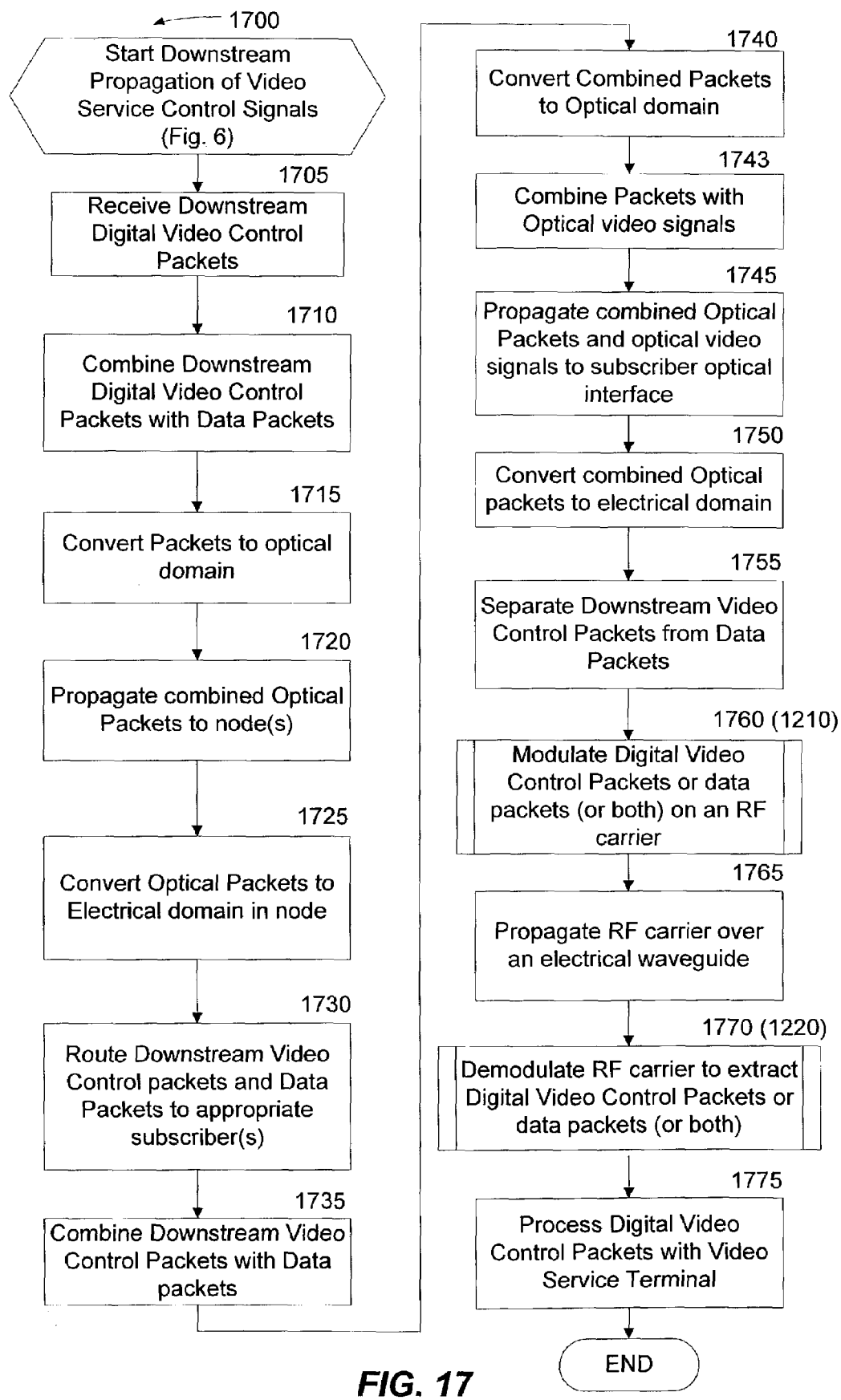
FIG. 17 is a logic flow diagram illustrating the exemplary processing of downstream video service control signals according to an exemplary embodiment of the present invention that corresponds with the communications flow illustrated in FIG. 6.

Referring now to FIG. 17, this figure is a logic flow diagram illustrating the exemplary processing of downstream video service control signals according to an exemplary embodiment of the present invention that corresponds with the communications flow illustrated in FIG. 6 discussed above. Method 1700 starts with first step 1705 in which downstream, electrical video service control packets are received from a video service controller 115. Next, in step 1710, the downstream video service control packets are combined with downstream data packets in either an internet router 340 or the laser transceiver node routing device 355.

In step 1715, the downstream packets are converted to the optical domain with an optical transmitter 325 in the data service hub 110. In step 1720, the combined downstream packets are propagated towards laser transceiver nodes 120 via optical wave guides 160. In step 1725, the optical packets are converted back to the electrical domain in the laser transceiver node 120. In step 1730, the downstream video control packets and data packets are routed with the optical tap routing device 434 to appropriate optical waveguides corresponding to subscribers. Next, in step 1735, the downstream video control packets and data packets are then combined in the tap multiplexer 440.

The combined packets are then converted back to the optical domain in step 1740. In step 1743, downstream optical video signals are combined with the optical packets with respective diplexers 420. In step 1745, the combined optical packets and video signals are propagated towards the subscriber optical interface 140 via optical waveguides 150. In step 1750, the combined optical packets are converted to the electrical domain with a digital optical receiver 540. In step 1755, the processor 550 separates the downstream video control packets from the regular data packets and routes them appropriately.

In routine 1760, the downstream video control packets are modulated onto an RF carrier. Routine 1760 generally corresponds with routine 1210 described above. Next, in step 1765, the RF carrier comprising the downstream video control packets are propagated over existing electrical waveguides 509 of the structure 602.

Next, in routine 1770, the RF carrier is demodulated to extract the digital video control packets. Routine 1770 generally corresponds with routine 1220 described above. In step 1775, the digital video control packets are processed with the video service terminal 117. The process then ends.

Figure 18:
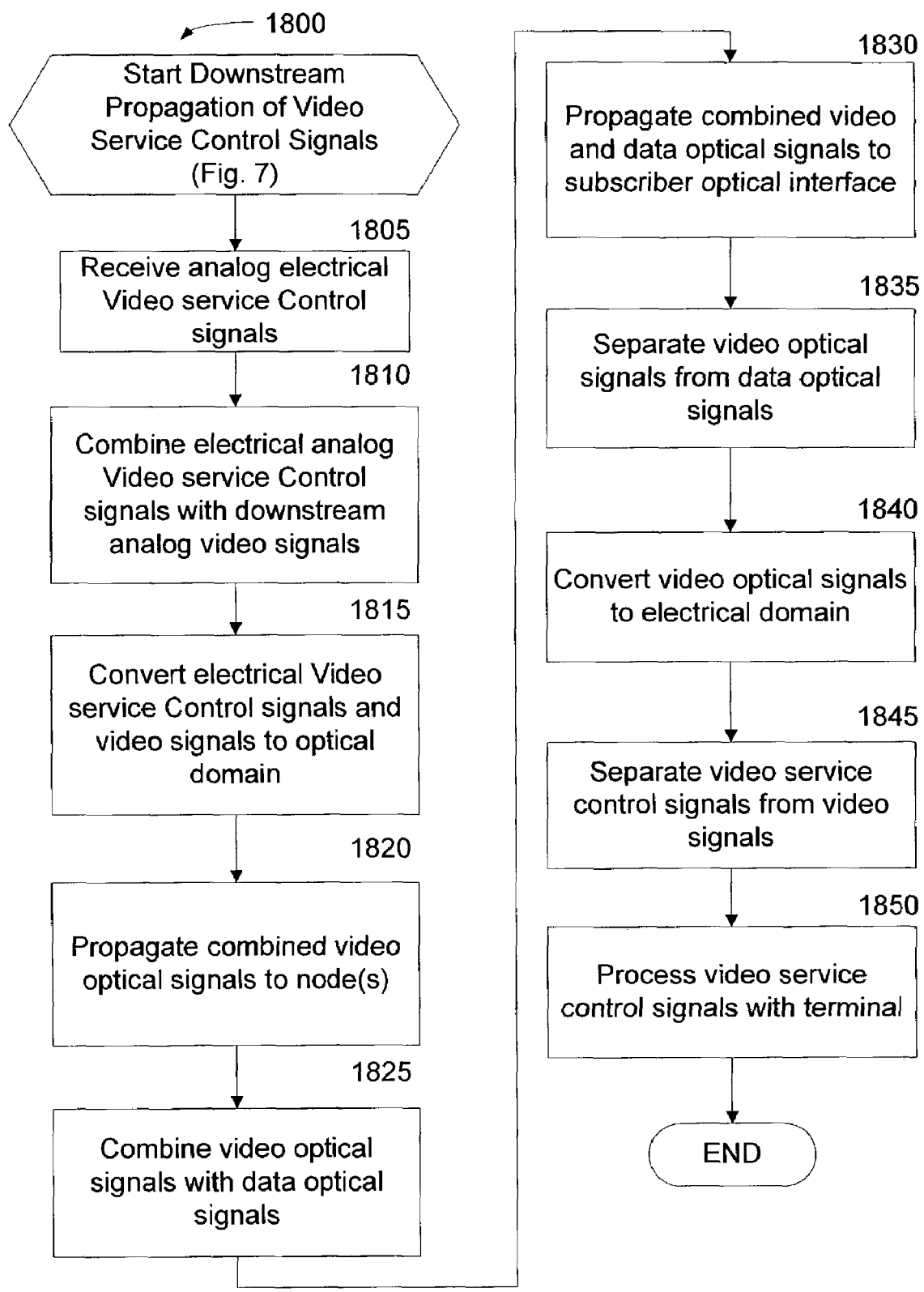
FIG. 18 is a logic flow diagram illustrating the exemplary processing of downstream video service control signals according to an exemplary embodiment of the present invention that corresponds with the communications flow illustrated in FIG. 7.

Referring now to FIG. 18, this Figure is a logic flow diagram illustrating the exemplary processing 1800 of downstream video service control signals according to an exemplary embodiment of the present invention. The steps described in this Figure generally correspond to the steps performed by the components illustrated in FIG. 7.

The downstream process 1800 starts in first step 1805. In step 2105, analog electrical video service control signals are received from a video service controller 115. The video service control signals are referred to as "analog" in this exemplary embodiment because they will be combined with other signals using frequency division multiplexing and propagated over an analog optical path. Next, in step 1810, the analog electrical video service control signals are combined with analog and digitally-modulated downstream video signals.

In step 1815, the electrical video service control signals and video signals are converted to the optical domain with an optical transmitter 325. In step 1820, the combined video optical signals are propagated towards laser transceiver nodes 120 via optical wave guides 160. In step 1825, the combined video optical signals are also combined with data optical signals in the laser transceiver node 120. Specifically, in an exemplary embodiment of the present invention, the video optical signals can be combined with the data optical signals in a diplexer 420. In step 1830, the combined video and data optical signals are propagated along an optical wave guide 150 to a subscriber optical interface 120. In step 1835, the video optical signals are separated from the data optical signals with an optical diplexer 515. Then in step 1840, the video optical signals comprising the video service control signals and the video signals are then converted to the electrical domain with an analog optical receiver 525 and propagated over the electrical waveguide 509 such as a coaxial cable (step 1840).

In step 1845, the video service control signals are separated from the regular video signals in the video services terminal 117. Next, in step 1850, the video service control signals are processed by the video service terminal 117.

Alternate Embodiments

The present invention is not limited to providing a return path for just legacy video service terminals 117. The return path of the present invention can be carry signals of other hardware devices that may not characterized as "legacy" hardware. The present invention may simply be used to provide increased bandwidth for additional conventional electronic communication devices that are supported by the optical network.

Conclusion

Thus, the present invention provides a unique method for inserting video control return packets (derived from control signals produced by a video service terminal) between upstream packets comprising data generated by a subscriber with a digital communication device such as a computer or internet telephone. Thus, the present invention provides a RF return path for legacy terminals that shares a return path for regular data packets in an optical network architecture.

It should be understood that the foregoing relates only to illustrate the embodiments of the present invention, and that numerous changes may be made therein without departing from the scope and spirit of the invention as defined by the following claims.

What is claimed is:

1. A method for providing a return path for signals in an optical network system comprising the following steps in seriatim:

receiving one of upstream electrical video control digital information packets and first data packets, the video control digital information packets and first data packets comprising Ethernet packets;

modulating the packets on a radio frequency (RF) carrier with a first RF modem that is positioned within a building, the step of modulating further comprises determining if video control digital information packets have been received and activating a switch in response to detecting video control digital information packets;

propagating the RF carrier on an electrical waveguide comprising a coaxial cables positioned within the building;

receiving the RF carrier with a second RF modem positioned at one of within the building and attached to the building;

demodulating the RF carrier with the second RF modem, the second RF modem demodulating the RF carrier into at least one of the upstream electrical video control digital information packets and the first data packets;

combining at least one of the upstream electrical video control digital information packets and the first data packets with second data packets prior to a data service hub, the second data packets comprising Ethernet packets;

after combining at least one of the upstream electrical video control digital information packets and the first data packets with second data packets, converting the combined packets into the optical domain; and propagating the optical packets over an optical waveguide outside of the building towards the data service hub.

2. The method of claim 1, further comprising generating upstream electrical video control digital information packets with a video services terminal.

3. The method of claim 1, further comprising generating upstream first data packets with a computer.

4. The method according to claim 1, further comprising converting the optical packets from an optical domain to the electrical domain at the data service hub.

5. A method for communicating information from a subscriber to a data service hub, comprising the following steps in seriatim:

generating electrical Ethernet packets;

modulating the electrical Ethernet packets onto a radio-frequency (RF) carrier with a first RF modem positioned within a structure, the step of modulating further comprises determining if video control digital information packets formatted as Ethernet packets have been received and activating a switch in response to detecting video control digital information packets;

propagating the RF carrier containing the electrical Ethernet packets over a coaxial cable positioned within the structure;

demodulating the RF carrier containing the electrical Ethernet packets with a second RF modem positioned at one of within the structure and attached to the structure;

combining the electrical Ethernet packets with electrical Ethernet packets from different sources with a logic device;

after combining the electrical Ethernet packets with electrical Ethernet packets from different sources with the logic device, converting the combined electrical Ethernet packets into an optical domain prior to a data service hub; and propagating the combined Ethernet packets over a single optical waveguide and outside of the structure towards the data service hub.

6. The method of claim 5, wherein generating electrical Ethernet packet comprises generating electrical Ethernet packets with one of a video services terminal and a computer.

7. The method according to claim 5, further comprising converting the combined Ethernet packets from an optical domain to the electrical domain at the data service hub.

8. The method according to claim 5, wherein combining the electrical Ethernet packets with electrical Ethernet packets from different sources with a logic device further comprises combining the electrical Ethernet packets with electrical Ethernet packets from different sources with a microprocessor.

9. The method according to claim 5, wherein the combining at least one of the upstream electrical video control digital information packets and the first data packets with second data packets prior to a data service hub further comprises combining electrical Ethernet packets with electrical Ethernet packets from different sources using a microprocessor.

* * * * *